United States Patent [19]
Shober

[11] Patent Number: 5,952,922
[45] Date of Patent: *Sep. 14, 1999

[54] IN-BUILDING MODULATED BACKSCATTER SYSTEM

[75] Inventor: R. Anthony Shober, Red Bank, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/775,701

[22] Filed: Dec. 31, 1996

[51] Int. Cl.$^6$ ............................................. G08B 13/14
[52] U.S. Cl. ................ 340/572.4; 340/505; 340/825.34; 340/825.54; 340/572.7; 343/878
[58] Field of Search ..................... 340/572, 505, 340/825.54, 825.34, 825.31, 825.49, 825.69, 825.72, 572.4, 572.7; 455/45, 106; 343/872, 878; 235/585, 380, 375; 705/28; 342/42, 44, 51

[56] References Cited

U.S. PATENT DOCUMENTS

| | | | |
|---|---|---|---|
| 3,944,928 | 3/1976 | Augenblick et al. | 340/572 X |
| 3,984,835 | 10/1976 | Kaplan et al. | 342/44 |
| 4,075,632 | 2/1978 | Baldwin et al. | 342/51 |
| 4,360,810 | 11/1982 | Landt | 342/44 |
| 4,471,345 | 9/1984 | Barrett, Jr. | 340/572 |
| 4,510,495 | 4/1985 | Sigrimis et al. | 340/825.54 |
| 4,584,534 | 4/1986 | Lijphart et al. | 329/308 |
| 4,641,374 | 2/1987 | Oyama | 342/51 X |

(List continued on next page.)

FOREIGN PATENT DOCUMENTS

| | | |
|---|---|---|
| 0670558 | 9/1995 | European Pat. Off. . |
| 0724351 | 7/1996 | European Pat. Off. . |
| 0750200 | 12/1996 | European Pat. Off. . |
| 52062 | 3/1988 | Japan . |
| 2098431 | 11/1982 | United Kingdom . |
| 2193359 | 2/1988 | United Kingdom . |
| 2202415 | 9/1988 | United Kingdom . |
| 05549 | 6/1989 | WIPO . |
| 19781 | 9/1994 | WIPO . |

Primary Examiner—Thomas Mullen

[57] ABSTRACT

In accordance with the present invention, a radio communications system is disclosed that can operate in one of several Modes which integrate in-building security, location determination, messaging, and data communications capabilities. The radio communication system includes at least one Interrogator for generating and transmitting a radio signal. One or more Tags of the system receive the radio signal. A Backscatter Modulator modulates the reflection of the radio signal using a subcarrier signal, thereby forming a reflected modulated signal. The Interrogator receives and demodulates the reflected modulated signal. The Interrogator can also transmit a first information signal to one or more tags, specifying which tags should respond using the Backscatter Modulator. In the Interrogation Mode, the Interrogator can determine the identity of the Tags in the reading field, and can exchange data with those Tags that have been identified. In the Location Mode, the radio communications system can instruct some or all Interrogators to determine the location of a Tag or Tags within the building, regardless of whether the Tag or Tags are in radio range of the Interrogation Mode. In the Messaging, or low speed data communications Mode, the radio communications system can instruct some or all Interrogators to transmit a command addressed to a particular Tag or Tags, regardless of whether the Tag or Tags are in the reading field of the Interrogation Mode, questing that Tag or Tags perform some action. Other embodiments of the Messaging Mode allow the Interrogator to transmit data in addition to a command to the Tag or Tags, and also for the Tag or Tags to transmit a signal back to the Interrogator. This radio communications system can be interconnected with other communications capabilities such as electronic mail, voice mail, location, inventory management, and other systems.

38 Claims, 9 Drawing Sheets

U.S. PATENT DOCUMENTS

| | | | |
|---|---|---|---|
| 4,691,202 | 9/1987 | Denne et al. | 340/825.54 |
| 4,739,328 | 4/1988 | Koelle et al. | 342/44 |
| 4,816,839 | 3/1989 | Landt | 343/795 |
| 4,888,591 | 12/1989 | Landt et al. | 342/44 |
| 4,937,581 | 6/1990 | Baldwin et al. | 342/44 |
| 4,963,887 | 10/1990 | Kawashima et al. | 342/44 |
| 5,030,807 | 7/1991 | Landt et al. | 235/375 |
| 5,214,409 | 5/1993 | Beigel | 340/572 |
| 5,227,803 | 7/1993 | O'Connor et al. | 342/442 |
| 5,252,979 | 10/1993 | Nysen | 342/50 |
| 5,305,008 | 4/1994 | Turner et al. | 342/44 |
| 5,305,459 | 4/1994 | Rydel | 235/375 X |
| 5,317,309 | 5/1994 | Vercellotti et al. | 340/825.54 |
| 5,339,073 | 8/1994 | Dodd et al. | 340/825.31 |
| 5,347,263 | 9/1994 | Carroll et al. | 340/572 |
| 5,390,339 | 2/1995 | Bruckert et al. | 455/440 |
| 5,400,949 | 3/1995 | Hirvonen et al. | 228/180.22 |
| 5,420,757 | 5/1995 | Eberhardt et al. | 361/813 |
| 5,423,056 | 6/1995 | Linquist et al. | 455/458 |
| 5,426,667 | 6/1995 | Van Zon | 375/219 |
| 5,448,242 | 9/1995 | Sharpe et al. | 342/42 |
| 5,455,575 | 10/1995 | Schuermann | 342/42 |
| 5,461,385 | 10/1995 | Armstrong | 342/42 |
| 5,463,402 | 10/1995 | Wairath et al. | 342/359 |
| 5,477,215 | 12/1995 | Mandelbaum | 340/825.34 |
| 5,479,160 | 12/1995 | Koelle | 340/825.7 |
| 5,479,416 | 12/1995 | Snodgrass et al. | 371/37.12 |
| 5,521,944 | 5/1996 | Hegeler et al. | 375/329 |
| 5,523,749 | 6/1996 | Cole et al. | 340/825.54 |
| 5,525,993 | 6/1996 | Pobanz et al. | 342/51 |
| 5,525,994 | 6/1996 | Hurta et al. | 342/51 |
| 5,530,202 | 6/1996 | Dais et al. | 174/35 R |
| 5,581,576 | 12/1996 | Lanzetta et al. | 455/45 X |
| 5,590,158 | 12/1996 | Yamaguchi et al. | 375/331 |
| 5,600,538 | 2/1997 | Xanthopoulos | 361/683 |
| 5,640,683 | 6/1997 | Evans et al. | 455/45 |
| 5,649,295 | 7/1997 | Shober et al. | 455/106 X |
| 5,649,296 | 7/1997 | MacLellan et al. | 455/106 X |
| 5,686,920 | 11/1997 | Hurta et al. | 342/42 |

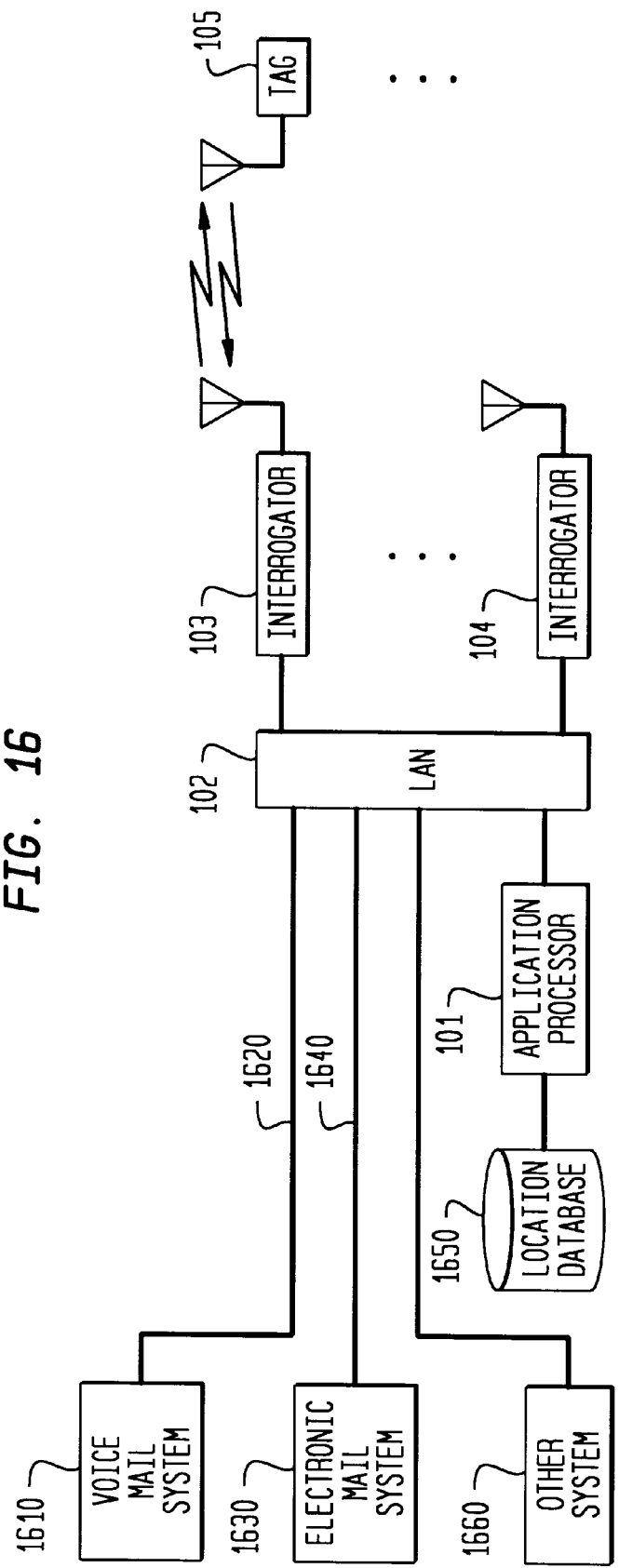

IN-BUILDING MODULATED BACKSCATTER SYSTEM

FIELD OF THE INVENTION

This invention relates to wireless communication systems and, more particularly, to an in-building or campus area wireless communication system using modulated backscatter technology.

RELATED APPLICATIONS

Related subject matter is disclosed in the following applications filed concurrently herewith and assigned to the same Assignee hereof: U.S. patent applications "Shielding Technology In Modulated Backscatter System," Ser. No. 08/777, 770; "Encryption for Modulated Backscatter Systems," Ser. No. 08/777,832; "QPSK Modulated Backscatter System," Ser. No. 08/775,694; "Modulated Backscatter Location System," Ser. No. 08/777,643; "Antenna Array In An RFID System," Ser. No. 08/775,217; "Subcarrier Frequency Division Multiplexing Of Modulated Backscatter Signals," Ser. No. 08/777,834; "IQ Combiner Technology In Modulated Backscatter System," Ser. No. 08/775,695; "In-Building Personal Pager And Identifier," Ser. No. 08/775,738, and referred to below as the "Shober-Pager" application; "Inexpensive Modulated Backscatter Reflector," Ser. No. 08/774, 499; "Passenger, Baggage, And Cargo Reconciliation System," Ser. No. 08/782,026. Related subject matter is also disclosed in the following applications assigned to the same assignee hereof: U.S. patent application Ser. No. 08/504, 188, now U.S. Pat. No. 5,640,683, entitled "Modulated Backscatter Communications System Having An Extended Range"; U.S. patent application Ser. No. 08/492,173, now U.S. Pat. No. 5,649,295, entitled "Dual Mode Modulated Backscatter System"; U.S. patent application Ser. No. 08/492,174, now U.S. Pat. No. 5,649,296, entitled "Full Duplex Modulated Backscatter System"; and U.S. patent application Ser. No. 08/571,004, entitled "Enhanced Uplink Modulated Backscatter System."

BACKGROUND OF THE INVENTION

Radio Frequency Identification (RFID) systems are used for identification and/or tracking of equipment, inventory, or living things. RFID systems are radio communication systems that communicate between a radio transceiver, called an Interrogator, and a number of inexpensive devices called Tags. In RFID systems, the Interrogator communicates to the Tags using modulated radio signals, and the Tags respond with modulated radio signals. After transmitting a message to the Tag (called the Downlink), the Interrogator then transmits a Continuous-Wave (CW) radio signal to the Tag. The Tag modulates the CW signal using modulated backscattering where the antenna is electrically switched, by the modulating signal, from being an absorber of RF radiation to being a reflector of RF radiation. This modulated backscatter allows communications from the Tag back to the Interrogator (called the Uplink). Conventional MBS systems are designed a) to identify an object passing into range of the Interrogator, and b) to store data onto the Tag and then retrieve that data from the Tag at a later time in order to manage inventory or perform another useful application.

Let us concentrate our attention to applications in a campus environment or inside a building, and first consider the use of RFID technology for "Security" applications. RFID is today used in the security industry to facilitate building access; for example, the use of an RFID Tag to automatically authorize entrance to a building, or to record that an individual passed by a particular location. This operation is called the Interrogation Mode—a mode of operation where the Interrogator transmits a signal to all Tags in the reading field, requesting those Tags to respond with data which identifies this Tag. The Tag then transmits this information back to the Interrogator using MBS.

In addition, "Location" applications exist within a building or campus. (For the remainder of this disclosure, we will use the term "building" or "in-building" to mean either within a building or within a campus environment which could include a building.) For example, it would be beneficial to know the location of a specific Tag within the building. This could be of benefit in high-security locations. Other applications of this capability include the ability of the in-building telephone system to route telephone calls to a phone close to where an individual is presently located. There have been prototype systems, using infrared transmitters, to address this application; however, there are no commercial products, and infrared technology suffers from lack of range and an inability to pass through objects. Thus, if the infrared transmitter is placed inside a person's shirt pocket, the communications path is blocked. Thus, today, there are no cost-effective solutions to the location problem.

In addition, low speed data "Communications" applications also exist. An example of a current system to provide low-speed data communications is Paging. Some Paging systems suffer from poor in-building wireless coverage, and some Paging systems require paying usage charges to a service provider on a per-transaction basis. Another alternative is to deploy a wireless data LAN in the building; however these products are still relatively expensive. In addition, none of the current low speed data communications alternatives address the Security or Location issues discussed above. Our goal is a system that will simultaneously address the Security, Location, and low-speed data Communications applications.

In this disclosure, we disclose how a radio frequency identification system, utilizing modulated backscatter, can be used to integrate the functions of Security, Location, and low speed data Communications in a single system with a single infrastructure. This invention can provide improved security as well as cost-effective in-building or campus area location and communications services.

SUMMARY OF THE INVENTION

In accordance with the present invention, a radio communications system is disclosed that can operate in one of several Modes which integrate in-building security, location determination, messaging, and data communications capabilities. The radio communication system includes at least one Interrogator for generating and transmitting a radio signal. One or more Tags of the system receive the radio signal. A Backscatter Modulator modulates the reflection of the radio signal using a subcarrier signal, thereby forming a reflected modulated signal. The Interrogator receives and demodulates the reflected modulated signal. The Interrogator can also transmit a first information signal to one or more tags, specifying which tags should respond using Backscatter Modulator means. In the Interrogation Mode, the Interrogator can determine the identity of the Tags in the reading field, and can exchange data with those Tags that have been identified. In the Location Mode, the radio communications system can instruct some or all Interrogators to determine the location of a Tag or Tags within the building, regardless of whether the Tag or Tags are in radio range of the Interrogation Mode. In the Messaging, or low speed data communications Mode, the radio communications system can instruct some or all Interrogators to transmit a command addressed to a particular Tag or Tags (regardless of whether the Tag or Tags are in the reading field of the Interrogation Mode) requesting that Tag or Tags perform some action. Other embodiments of the Messaging Mode allow the Interrogator to transmit data in addition to a command to the Tag or Tags, and also for the Tag or Tags to transmit a signal back to the Interrogator. This radio communications system can be interconnected with other communications capabilities such as electronic mail, voice mail, location, inventory management, and other systems.

BRIEF DESCRIPTION OF THE DRAWING

In the drawing,

FIG. 16 shows how the RFID System of FIG. 1 can be interconnected to electronic mail and voice mail systems;

DETAILED DESCRIPTION

MBS Operation

Figure 1:
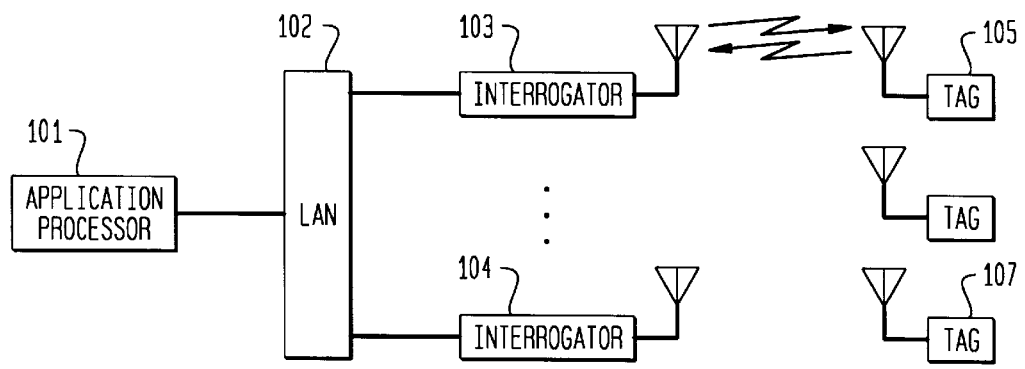
FIG. 1 shows a block diagram of an illustrative Radio Frequency Identification (RFID) system.
Figure 2:
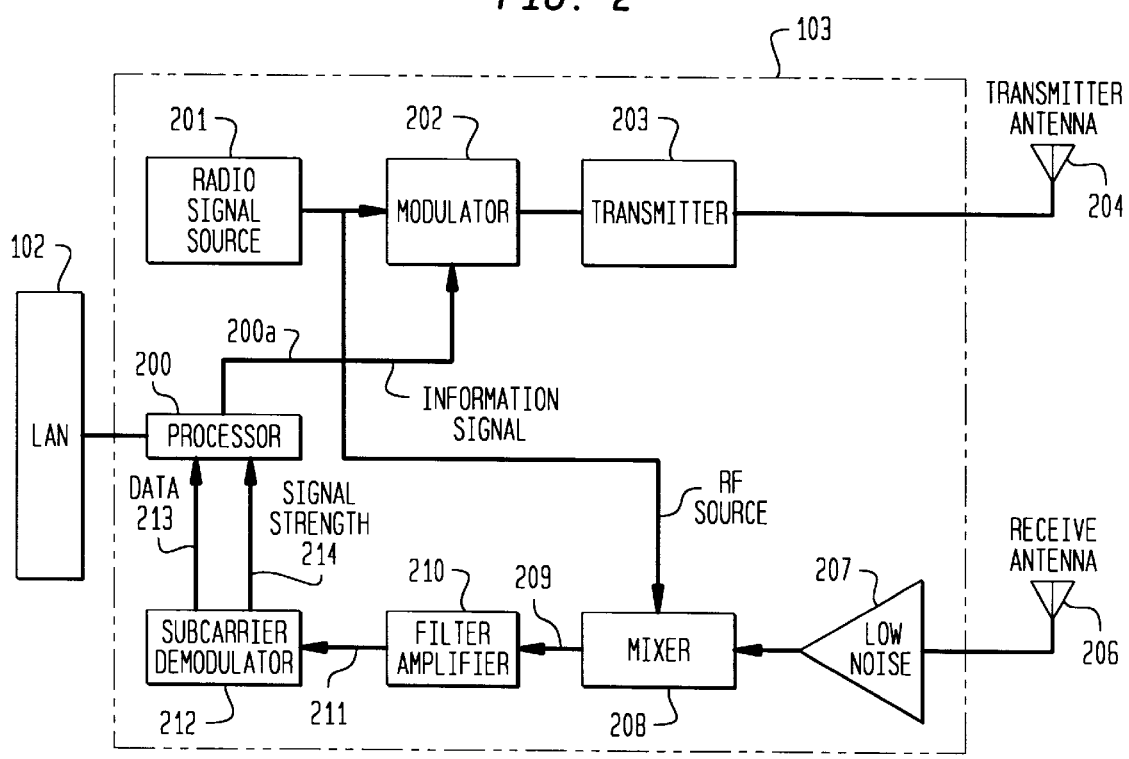
FIG. 2 shows a block diagram of an illustrative Interrogator Unit used in the RFID system of FIG. 1.

We now describe how a typical RFID system, utilizing MBS, operates. With reference to FIG. 1, there is shown an overall block diagram of a traditional RFID system. An Applications Processor 101 communicates over a Local Area Network (LAN, 102), which could be wired or wireless, to a plurality of Interrogators (103, 104). The Interrogators may then each communicate with one or more of the Tags (105, 107). For example, the Interrogator 103 receives an information signal, typically from an Applications Processor 101. The Interrogator 103 takes this information signal and Processor 200 properly formats a Downlink message (Information Signal 200a) to be sent to the Tag. With joint reference to FIGS. 1 and 2, Radio Signal Source 201 synthesizes a radio signal, the Modulator 202 modulates this Information Signal 200a onto the radio signal, and the Transmitter 203 sends this modulated signal via Antenna 204, illustratively using amplitude modulation, to a Tag. The reason amplitude modulation is a common choice is that the Tag can demodulate such a signal with a single, inexpensive nonlinear device (such as a diode).

In the Tag 105 (see FIG. 3), the Antenna 301 (frequently a loop or patch antenna) receives the modulated signal. This signal is demodulated, directly to baseband, using the Detector/Modulator 302, which, illustratively, could be a single Schottky diode. The result of the diode detector is essentially a demodulation of the incoming signal directly to baseband. The Information Signal 200a is then amplified, by Amplifier 303, and synchronization recovered in Clock Recovery Circuit 304. The Clock Recovery Circuit 304 can be enhanced by having the Interrogator send the amplitude modulated signal using Manchester encoding. The resulting information is sent to a Processor 305. The Processor 305 is typically an inexpensive 4 or 8 bit microprocessor; the Clock Recovery Circuits 304 can be implemented in an ASIC (Application Specific Integrated Circuit) which works together with or is incorporated within the integrated circuit containing Processor 305. This Processor 305 can also serve as the driver for an optional Display Unit 309 should this Tag require a display. The Processor 305 generates an Information Signal 306 to be sent from the Tag 105 back to the Interrogator (e.g., 103). This Information Signal 306 is sent to a Modulator Control Circuit 307, which uses the Information Signal 306 to modulate a subcarrier frequency generated by the Frequency Source 308. The Frequency Source 308 could be a crystal oscillator separate from the Processor 305, or a signal derived from the output of a crystal oscillator, or it could be a frequency source derived from signals present inside the Processor 305—such as a multiple of the fundamental clock frequency of the Processor. The Modulated Subcarrier Signal 311 is used by Detector/Modulator 302 to modulate the modulated signal received from Tag 105 to produce a modulated backscatter (i.e., reflected signal). This is accomplished by switching on and off the Schottky diode using the Modulated Subcarrier Signal 311, thereby changing the reflectance of Antenna 301. A Battery 310 or other power supply provides power to the circuitry of Tag 105.

There are a variety of techniques for using Modulated Backscatter (MBS) to send information from the Tag to the Interrogator. In some MBS technologies, the Modulator Circuit 307 of the Tag generates a modulated signal, which is amplitude modulated by an Information Signal 306 at frequency $f_2$. If the Radio Signal Source 201 generates an unmodulated frequency $f_1$, then the Interrogator receives signals inside of the range $(f_1-f_2)$ to $(f_1+f_2)$, and generally filters out signals outside of that range. This could be termed the "MBS at baseband" approach. Another approach would be for the Tag to generate two different subcarrier frequencies. The information could be conveyed in a frequency-shift keyed (FSK) fashion with the subcarrier frequency transitioning between these two frequencies. Other modulation schemes are possible as well, such as Phase Shift Keying (PSK) of a single subcarrier frequency (e.g., BPSK, QPSK) or other complex modulation schemes (e.g., MFSK, MASK, etc.).

Returning to FIG. 2, the Interrogator 103 receives the reflected and modulated signal with the Receive Antenna

206, amplifies the signal with a Low Noise Amplifier 207, and demodulates the signal using homodyne detection in a Quadrature Mixer 208. (In some Interrogator designs, a single Transmit (204) and Receive (206) Antenna is used. In this event, an electronic method of canceling the transmitted signal from that received by the receiver chain is needed; this could be accomplished by a device such as a Circulator.) Using the same Radio Signal Source 201 as used in the transmit chain means the demodulation to baseband is done using Homodyne detection; this has advantages in that it greatly reduces phase noise in the receiver circuits. The Mixer 208 then sends the Demodulated Signal 209 (if a Quadrature Mixer, it would send both I (in phase) and Q (quadrature) signals) to the Filter/Amplifier 210. The resulting filtered signal—which in this invention is an Information Signal 211 carried on a subcarrier—is then demodulated from the subcarrier in the Subcarrier Demodulator 212, which then sends the Information Signal 213 to a Processor 200 to determine the content of the message. The I and Q channels of Signal 209 can be combined in the Filter/Amplifier 210, or in the Subcarrier Demodulator 212, or they could be combined in the Processor 200.

Using, e.g., the above techniques, a short-range, bidirectional digital radio communications channel is implemented. A relatively inexpensive implementation is achieved using, as exemplary components, a Schottky diode, an amplifier to boost the signal strength, bit and frame synchronization circuits, an inexpensive 4 or 8 bit microprocessor, subcarrier generation circuits, and a battery. Most of these items are already manufactured in quantities of millions for other applications, and thus are not overly expensive. The circuits mentioned above for bit and frame synchronization and for subcarrier generation can be implemented in custom logic surrounding the microprocessor core; thus, except for a relatively small amount of chip real estate, these functions come almost "for free."

Narrowband Operation

Using the above procedures, a two-way digital radio communications channel can be constructed. We desire to extend the range of this two-way digital radio communications channel as much as possible. This involves both extending the range of the Downlink and also extending the range of the Uplink.

Extending the range of the Downlink involves several factors. The Downlink is generally an amplitude modulated signal, which is easily and inexpensively detected by a single nonlinear device, such as a microwave diode. It is important to match the impedances between the antenna and the diode to avoid gratuitous signal attenuation. The data rate of the Downlink must be limited in order to reduce the noise bandwidth of the Downlink signal. We now discuss how the Tag can filter out unwanted signals without increased cost. The Antenna (301) not only performs the tasks of receiving the RF signal, but it also filters RF signals outside of the antenna bandwidth. For example, at 2.45 GHz, allowable RF carrier frequencies are from 2.400–2.485 GHz. The design of the antenna, frequently a patch antenna, covers this frequency band but filters out frequencies beyond this range. An ideal frequency response would be for the antenna sensitivity to be within 3 dB across the allowable frequency range, but to fall off rapidly beyond this range. In addition, the Amplifier (303) also acts as a filter in the sense that the Amplifier is designed to only pass Amplitude Modulated (AM) signals that are within a certain passband around the expected Downlink data rate, which is typically a few kilobits per second. Therefore, although the Tag is relatively simple, it has filtering capability to filter out both RF signals whose frequency is outside the Antenna bandwidth, and also to filter out AM signals whose frequency is outside of the Amplifier passband. This Tag design is also not greatly sensitive to RF transmissions, inside the band of the antenna, whose modulation scheme is primarily constant envelope. Thus, this design allows a robust Tag which is resistant to many potential interfering signals.

Extending the range of the Uplink also involves several factors. First, the noise bandwidth of the Uplink signal must be reduced as much as possible. A number of useful applications can be implemented even if the data rate of the Uplink signal is limited to a few bits per second. Indeed, this limitation of the data rate can be taken to the extreme in which there is no data modulated onto the single subcarrier frequency; in this case, the mere presence or absence of a signal received at this subcarrier frequency indicates an "acknowledgment" or "no acknowledgment" to a previously received message.

We further note that the subcarrier frequency can be relatively accurately determined. For example, commercially available crystals exist with a frequency of 32 kHz, and an accuracy of ±100 ppm. Thus, the frequency of this crystal is known to ±3.2 Hz. The Tag thus generates a subcarrier frequency, $f_s$, of great accuracy. The Interrogator receives the reflected signal, and demodulates it as discussed above using Homodyne detection.

The Filter Amplifier (210) and Subcarrier Demodulator (213) function could then be implemented, together, inside a processor such as a DSP. Narrowband filtering algorithms exist in the literature which can perform digital filtering of the signal with a bandwidth of less than 10 Hz, and where the first sidelobes are depressed 60 dB. Then, the signal strength of the signal received through this digital filter is measured, and that strength is compared to a reference signal strength which is sufficiently above the average noise in that channel when no signal is present such that spurious noise spikes are not misinterpreted as actual signals.

In this manner, very weak Uplink signals can be reliably detected. It has been found that, using these techniques, roughly equivalent range in the Downlink and the Uplink can be achieved.

We now discuss the location of the subcarrier frequency $f_s$. MBS systems exhibit noise in the Uplink signals due to reflections of the RF source from any number of reflectors. Walls and metal objects reflect RF radiation; these reflected signals are received by the Interrogator 103 at the same carrier frequency as they were transmitted. The Quadrature Mixer 208 is operated as a Homodyne Detector and thus is used to cancel these reflections. However, other reflectors generate reflected noise at frequencies away from the main carrier frequency—either from Doppler shifts or, more likely, from reflections off of electronic equipment operating at frequencies near the Subcarrier Frequency.

One particularly difficult source of noise is fluorescent lights, which have been shown to produce noise not only at their fundamental 60 Hz (in the United States) frequency, but also at overtone frequencies well up into the tens of thousands of Hertz. It has been found especially helpful to locate the subcarrier frequency $f_s$ such that it falls between multiples of the fundamental 60 Hz frequency. From the 32 kHz crystal, simple circuits can generate the appropriate subcarrier frequency.

Multiple Mode Operation

The basic features of multiple mode operation are that a) the Tag must be capable of receiving a Downlink message; b) the Tag must be told what type of Uplink message it is to transmit, whether it be an actual data message (higher bit rate mode) or a simple acknowledgment message (long range mode), based upon information received in the Downlink message; c) the Tag transmits the requested type of Uplink message; and d) the Interrogator interprets the Uplink message received in a proper manner. Several different types of acknowledgment messages in the long range mode can exist. Generally, an acknowledgment message has a data rate which is much less than the data rate of an actual data message (the higher bit rate mode), thus allowing filtering over a much smaller frequency band, and thus allowing greater range than the higher bit rate mode since the noise bandwidth of the received signal is lessened due to the narrowband filtering. Thus, an acknowledgment message could consist of a low bit rate data message, or it could consist of a single bit of information. As discussed above, to send a single bit of information, the Tag could generate an unmodulated subcarrier frequency which could be modulated onto the incident signal, using modulated backscatter. The Interrogator would then receive a reflected signal with a single frequency tone. Narrowband filtering techniques could then be used to reduce the noise bandwidth and determine the presence or absence of this signal.

The Tag 105 detects and assembles the bits of information sent from the Interrogator 103 into a complete Downlink message. Typically, a pattern of synchronization bits is transmitted at the beginning of the Downlink message; these bits allow the Tag to acquire bit and message synchronization; enabling the Tag to determine the beginning and the end of the Downlink message. The Downlink message contents would include an Address, a Command, optionally include Data, and also include Error Detect. The Command or Data portion of the Downlink message could indicate that the Tag 105 should return a Message to the Interrogator; for example, the Tag could return stored data, such as the Tag ID, or other application-specific data. Another type of Downlink message could indicate that the Tag should send back only a single-bit acknowledgment message.

Figure 3:
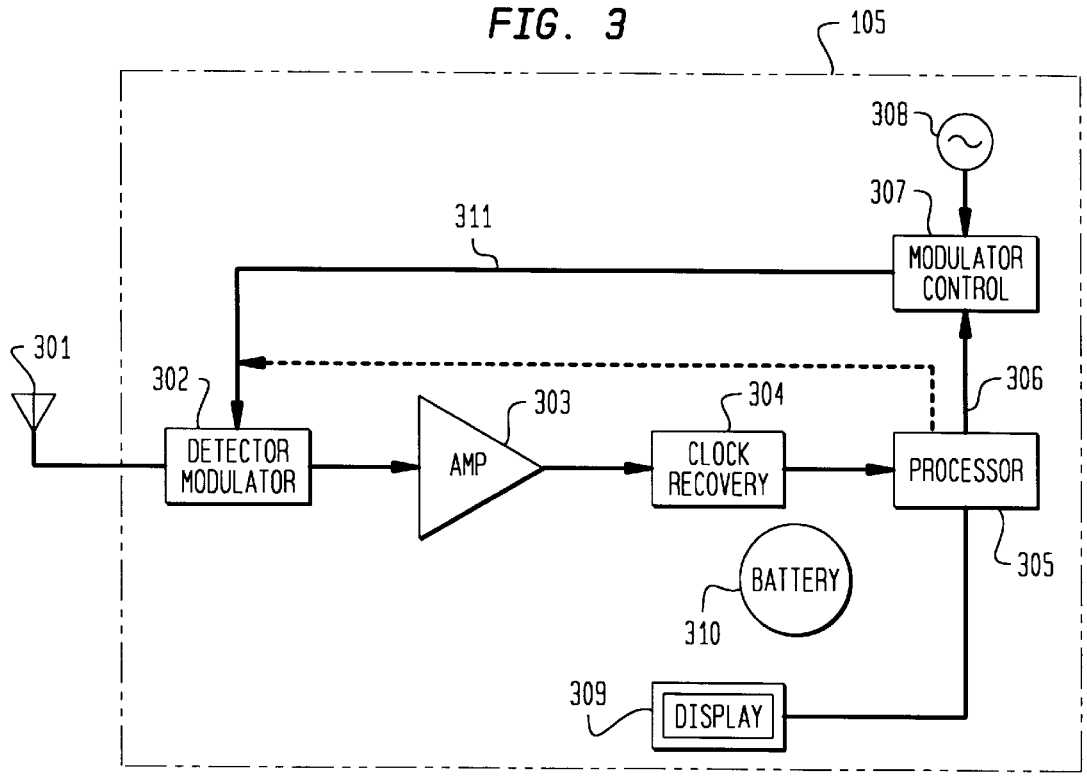
FIG. 3 shows a block diagram of a Tag Unit used in the RFID system of FIG. 1.

Thus, the Processor 305 of the Tag 105 determines, in response to information in the Downlink message, what type of Uplink signal to transmit: a data message or a simple acknowledgment message. There are several ways that the Tag 105 may transmit either a data message or a simple acknowledgment message so that the Interrogator 103 can, relatively easily, receive and distinguish between these two different types of messages. Referring to FIG. 3, in the event that the Tag 105 is to send a multi-bit information signal, Processor 305 sends the Information signal to the Modulator Control 307, which modulates the signal from Subcarrier Frequency Source 308.

In Tag 105, Processor 305 sends the Information Signal over the Information Signal Lead 306 shown in FIG. 3. In the event that Processor 305 of Tag 105 is to send a "single tone" message consisting of a single information bit, the Information Signal Lead 306 is maintained at a first logic state to indicate that no information message is to be sent. Thus, an unmodulated subcarrier frequency signal is outputted by Modulator Control 307. In the event that Processor 305 determines that a multi-bit message is to be sent, the Information Signal Lead 306 conveys the multi-bit message to Modulator Control 307. This multi-bit message (information signal) is then used to modulate the subcarrier frequency using one of several possible modulation techniques, such as amplitude, phase, frequency, or code modulation.

The Interrogator 103 (FIG. 2) demodulates the subcarrier signal from the received RF signal, and then applies filtering. Given the specifics of the subcarrier frequency, a suitable filtering amplifier is utilized. Subcarrier Demodulator 212 then demodulates the subcarrier signal. The Processor 200 then performs the digital signal processing necessary to decode the information. In some implementations of this invention, the Processor may be a Digital Signal Processor (DSP); in others, a conventional Microprocessor could be used. To recover a "single tone" acknowledge signal from Tag 105, consisting of a single subcarrier tone, the filtering amplifier would be a narrowband filter. While conventional filter technologies could be used, it may be most effective to utilize the DSP mentioned above as a narrowband filter. The subcarrier frequency of this single tone is well known; as the Tag 105 would typically use an inexpensive crystal as the frequency source. Even with the limited accuracy of that crystal, the subcarrier frequency could be known to an accuracy of a few Hertz. Thus, very narrowband filters could be used. Since the acknowledge signal response from Tag 105 is used to extend the range of the RFID system and consequently would likely be a very faint signal, it places an additional burden on the narrowband filter of filtering amplifier 210.

Another way that the DSP mentioned above could be used is to dynamically search for the frequency components of the Uplink signal. This could be accomplished by performing a Fourier Transform on the incoming data stream, perhaps using a DSP, or using Processor 200 of FIG. 2. In this manner, the multiple signals representing a modulated subcarrier signal could be differentiated; or, a single subcarrier signal of uncertain data rate could be recovered by using the Fourier Transform to search for multiple signals.

Thus, we have shown how a modulated backscatter communication system can operate in two modes—one in which the backscattered signal is modulated to provide a high data rate Uplink communication channel, and one in which the backscattered channel is modulated with a low data rate signal, perhaps a single tone, to provide an Uplink acknowledgment signal that can be detected at great distances.

We now use and extend the above discussion so that several Modes of operation are present, where the different Modes are characterized by different uplink data rates. The first Mode to be discussed here is the "Interrogation Mode." The Interrogation Mode begins with the Interrogator transmitting an Interrogation Signal to the Tag. The Tag receives this Interrogation Signal, decodes it, and determines what actions to take based upon the decoded Interrogation Signal. In a "standard" Interrogation, the Tag would be requested to transmit a particular set of data (called here the Mandatory Data) back to the Interrogator, using the MBS technique discussed above. Each Tag in the reading field of the Interrogator that receives the "standard" Interrogation responds with its Mandatory Data, using a protocol discussed below. The Interrogator also transmits, as part of the "standard" Interrogation Signal, data intended for each and all Tags. Examples of such data include time of day, framing and other synchronization information, etc.

Beyond the "standard" Interrogation, other types of Interrogations are possible as well. For example, the Interrogator, after identifying a specific Tag using the Interrogation Mode, could transmit additional data to that Tag to be stored in the Tag's memory. The Interrogator could also request the Tag transmit other data, stored in the Tag's memory, back to the Interrogator. These additional data communications could be performed at the same data rate used in the "standard" Interrogation. Thus, the Interrogation Mode is used to: transmit commands and data to each and every Tag, identify a specific Tag in the reading field, and also used to communicate in a bidirectional manner with that specific Tag. In the Interrogation Mode, the data rate required in the Downlink is typically not large, since the Interrogation Signal only must contain enough bits to request all Tags in the reading field to respond. Even when significant amounts of Downlink data are transmitted, in many applications this process does not take place frequently and the Downlink data rate is not critical. In the Uplink, the data rate is typically much larger than the Downlink data rate, as the Mandatory Data must frequently be transmitted in the Uplink in a time critical manner. Therefore, in the Interrogation Mode, we have an asymmetry in required data rates in the sense that the Downlink data rate is smaller than the Uplink data rate.

For the second, or Location Mode, the Interrogator transmits an Interrogation Signal to the Tag containing the address of a specific Tag to which this Interrogation Request is directed. In this Mode, the Tag is not requested to respond with the Mandatory Data discussed above. Instead, at least in some embodiments, the requested response is a simple acknowledgment. One embodiment of a simple acknowledgment is a constant-tone signal. Using the narrowband techniques discussed above, a constant-tone signal can be received by the Interrogator at a range far beyond the range of the Interrogation Mode. Therefore, in the Location Mode, we have an asymmetric communications path which has greater data rate in the Downlink than in the Uplink.

We now discuss methods to determine the location of a specific Tag (105). Let us assume that the system currently has no information as to the location of this Tag. Then, an Interrogation Signal is transmitted by all Interrogators, and all Interrogators listen for a response. In one embodiment, each Interrogator can determine the signal strength of the received signal (if any), and those signal strengths can be reported to a central control element. The determination of location, based upon this data, can be done in several ways. The most obvious way is for the control element to determine which Interrogator received the strongest signal strength. Then, the location of the Tag is equal to the location of that Interrogator, to an accuracy of the effective range of that Interrogator. A more complex method could be implemented if more than one Interrogator received a return signal. Then, given a knowledge of the spatial position of each Interrogator, a refinement on the above positioning could be achieved. For example, if two Interrogators received a return signal, of equal signal strengths, then the Tag's position could be estimated at half way between those two Interrogations. If three Interrogators received a return signal, then a "triangulation" could be performed. It should be apparent that these methods will perform better if there are line-of-sight paths between the Interrogators and the Tag; if the RF communications paths rely on reflections, distorted location results could be obtained. However, it is likely that locations can be determined to an accuracy of the effective range of an Interrogator. Based upon which Interrogator receives the simple acknowledgment, a Location capability can be implemented.

For the third, or Messaging Mode, the Interrogation Signal not only contains the address of a Tag or Tags, but it also may contain data intended for that Tag or Tags. The Tag or Tags whose address matches the Tag address in the Interrogation Signal could be requested to store that data in the Tag's memory, or perform some other function with that data. There are several possible responses to an Interrogation Signal for the Messaging Mode. If the command within the Interrogation Signal requests the Tag to simply store data, then an acknowledgment to indicate successful receipt of the message could be a few bits or even a single bit of information. A single bit of information could be implemented as a constant tone acknowledgment, as mentioned above. Alternatively, if the command within the Interrogation Signal requests the Tag to make a decision, or to transmit other data back to the Interrogator, then the response would be a message consisting of more than a few bits of information. Therefore, in the Messaging Mode, we again have an asymmetric communications path which has greater data rate in the Downlink than in the Uplink.

We observe that the data-rate asymmetry found in the Location and Messaging Modes is similar to the data-rate asymmetry found in a two-way paging system. Paging transmitters (comparable to the Interrogators discussed here) have much greater transmit power than is available in a two-way paging device worn by an individual (the paging device is comparable to the Tags discussed here). Therefore, data rates in two-way paging systems are frequently asymmetric, with greater Downlink data rate than Uplink data rate. The Location and Messaging Modes of the in-building MBS system disclosed here are similar to a two-way paging system, both in technical characteristics and in applications that are supportable.

It is also possible for a transaction that began in one of the above Modes to transition into another Mode of operation. The following is an illustration of the capabilities of the system. Let us assume we wish to communicate with a Tag. A Messaging Mode Interrogation Signal is transmitted from the Interrogator to the Tag, sending data to the Tag, and requesting the Tag to respond with a simple acknowledgment, which is received by the Interrogator. Let us further assume that, based upon the simple acknowledgment received by the Interrogator, the Interrogator wishes to request that additional data, perhaps stored in the Tag's memory, be transmitted back to the Interrogator. In one embodiment, the Interrogator determines the signal strength of the simple acknowledgment signal. If the signal strength is below a certain threshold, then the Uplink data rate is limited to that data rate normally used in the Uplink for the Messaging Mode. If the signal strength is above a certain threshold, then the radio communications path between the Interrogator and this Tag can support communications at the data rate normally used in the Uplink for the Interrogation Mode. If the signal strength is below the threshold, then either data communications can continue, but using the (lower) Uplink data rate of the Messaging Mode, or a messaging could be transmitted to the Tag requesting that the Tag be brought into close proximity to an Interrogator (how that request is received by a human being is described in the above-cited Shober-Pager application. If the signal strength is above the threshold, then data communications can continue; but using the Interrogation Mode, as discussed above. It should be obvious that, while the above example shows how the Uplink communications could take place at either one of two possible Uplink data rates, it would be possible to extend the above concept to support more than two Uplink data rates.

We now discuss how the three Modes of operation discussed above can coexist in the same system and be operational at the same time. We begin with the realization that these Modes of operation, based upon the required data rates, support different ranges from the Interrogator to the Tag. For example, the Interrogation Mode involves significant data transmission over (relatively) short time periods, such as when an individual walks by an Interrogator. The required data rate is further increased, since there can be several individuals in the reading field at one time. Thus, a protocol (such as Aloha or Slotted Aloha) is required to allow those multiple Tags to respond with their Interrogation data without mutually interfering, thus increasing required data rate. Examples of data rate for communication from the Tag to the Interrogator for the Interrogation Mode range from 50 kbps–300 kbps. We also note that, in the absence of other factors, range and data rate trade off against each other.

Figure 4:
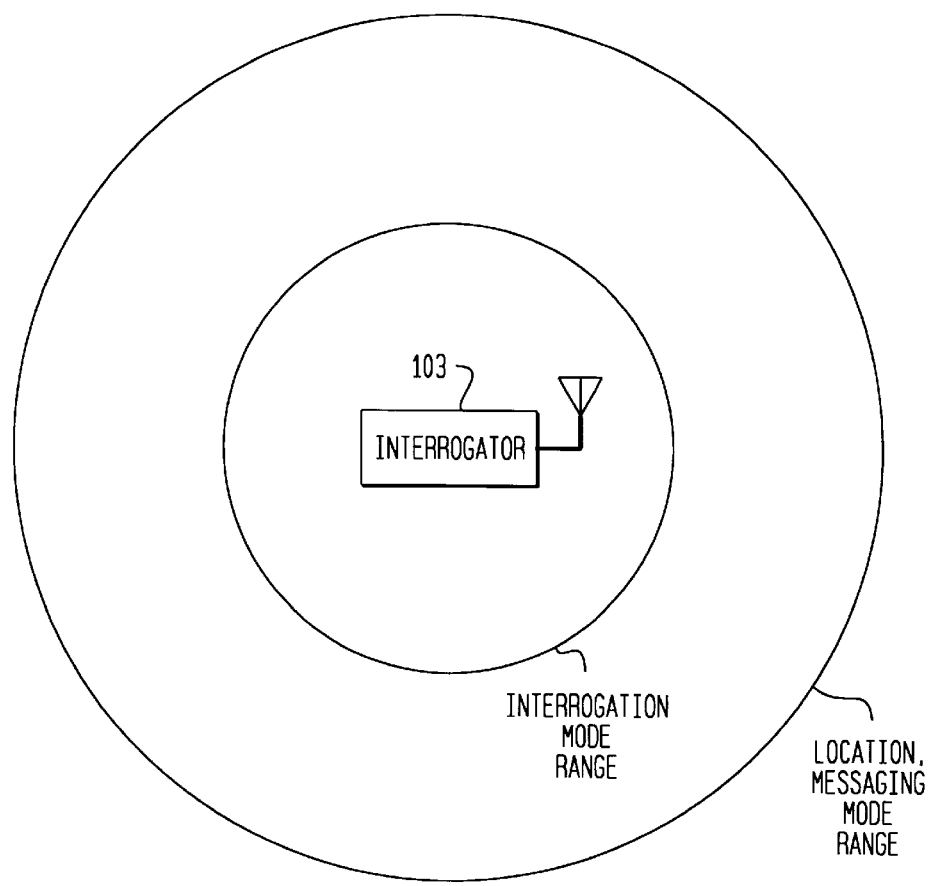
FIG. 4 shows the relationships among the Interrogation Mode, Location Mode, and Messaging Mode Ranges.
Figure 5:
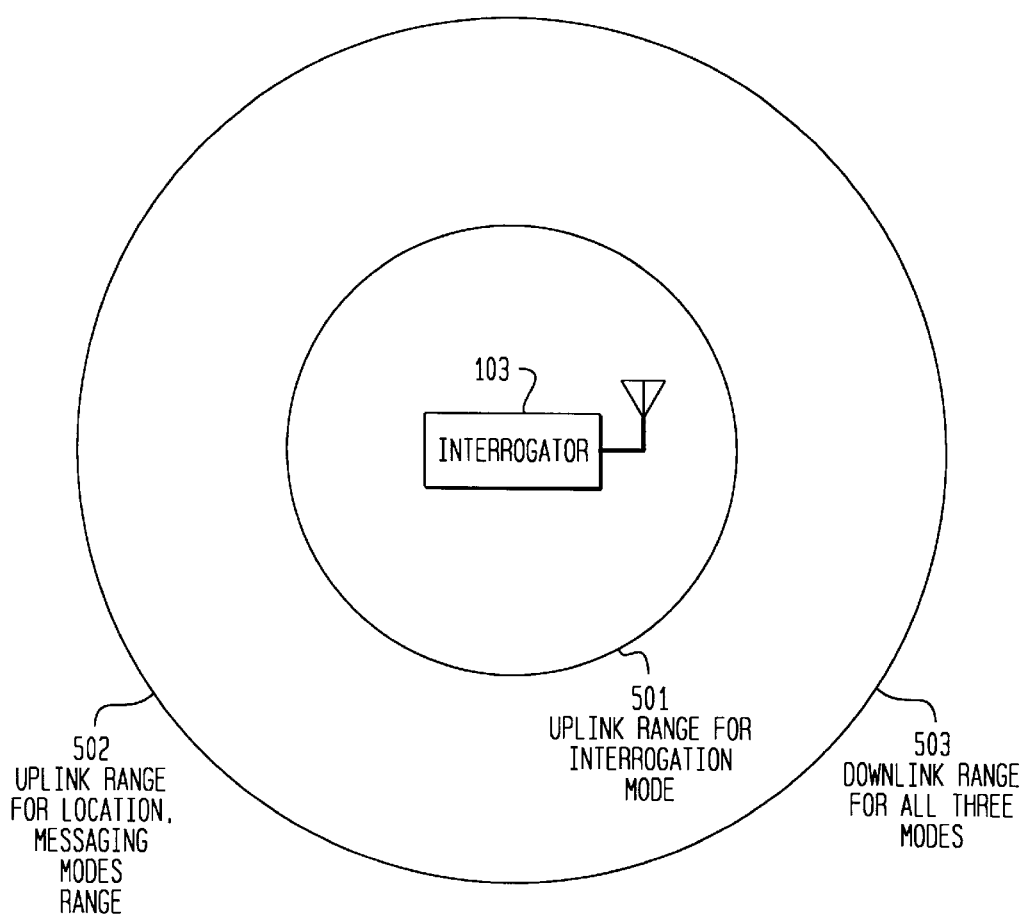
FIG. 5 shows the relationships among the Uplink Range for the Interrogation Mode, the Uplink Range for the Location and Messaging Modes, and the downlink Range for all three Modes.

In summary, we have two different "asymmetries" in data rates; greater Uplink than Downlink data rate for the Interrogation Mode, and greater Downlink than Uplink data rate for the Location and Messaging Modes. Thus, the effective range for the Interrogation Mode is smaller than that of the Location or Messaging Modes, because the Uplink data rate requirement is greater in the Interrogation Mode. This difference in ranges is illustrated in FIG. 4. It is important to observe the relationships between these data rates. In the "Narrowband Operation" section above, we disclose how to achieve significant range extension. In that discussion, a Downlink data rate of a few kilobits per second, and an Uplink data rate of a few bits per second, give roughly comparable range. This capability corresponds to the requirements of the Location and Messaging Modes discussed above. For the Interrogation Mode, a Downlink data rate of a few kilobits per second is also adequate, since relatively few bits of data in the Downlink are required, and Uplink data rates are from 50 kbps–300 kbps. FIG. 5 shows the relationship between the ranges for these three Modes of operation. The Downlink range is the same for all three Modes (503). The Uplink range for the Location and Messaging Modes (502) is roughly the same as the Downlink range (503). The Uplink range for the Interrogation Mode (501) is much smaller.

The above discussion ignores the effects of directional antennas. In some Interrogation Mode applications, it is appropriate to use directional antennas to increase effective range, and to form a "reading field" whose shape and size is optimized to that application. The above discussion has been general, and implicitly assumes that all three Modes of operation use the same antenna technology. The use of different antenna patterns will be discussed below.

RFID System Architecture

We now discuss the RFID system architecture, which is presented in FIG. 1. The Interrogators (103) are interconnected by a LAN, which could be wired or wireless, to one or more Application Processors (101). The Interrogators are distributed throughout the building. We assume (for purposes of this pedagogical discussion) that the coverage throughout the building for the Interrogation Mode is not complete; i.e., that the Interrogation Mode is only available in certain well defined areas of the building. This assumption is justified since the Interrogation Mode is generally used to identify Tags as they pass by a specific location (such as a doorway, etc.) We further assume that for the Location and the Messaging Modes, we wish to cover as much of the building as practical. Thus, we desire to provide Location and Messaging services to anyone in the building.

Referring to the Location or Messaging Modes, one technique would be to emplace enough Interrogators to put any point in the building within the radio coverage areas of at least three Interrogators. Then, to implement the Location Mode, a triangulation technique could be used, based upon the received signal strength of the Uplink signal. Although this technique is frequency used today for outdoor location services, for an in-building system this might be viewed as overly costly, because relatively many Interrogators would be required. Also, in-building radio propagation tends to be dominated by multipath; thus the triangulation technique is not very accurate.

In another technique, Interrogators are placed in a "partially overlapping" fashion, such that any point in the building is within the radio coverage area of at least one Interrogator. Given this configuration, a relatively simple Location Mode can be implemented, with the accuracy of the Location Mode comparable to the coverage area of one Interrogator.

We now discuss how to implement the Location Mode for the case that the Interrogators are deployed in a "partially overlapping" fashion. Let us assume that the Tag we wish to locate is within the Downlink range as discussed above. Then, that Tag can receive the Downlink Signal containing the Tag Address. Once this Tag determines that the Downlink Message is intended for it, the Tag (according to a specific protocol, see below) transmits an Uplink acknowledgment message, which in one embodiment is a constant acknowledgment tone. The details of generating and transmitting this tone are discussed below. This Uplink signal is received by the Interrogator.

The most common antenna configuration to support the above scenario is for the Downlink transmit and the Uplink receive antennas to both be generally omnidirectional. For example, at 2.45 GHz (where such systems might be used), an antenna could be a one quarter wavelength monopole extending downward from a round ground plane (such as a piece of metal); such an antenna could be mounted in the ceiling, and the antenna pattern would be generally omnidirectional but with most of the antenna pattern in the volume of space below the ground plane.

Figure 6:
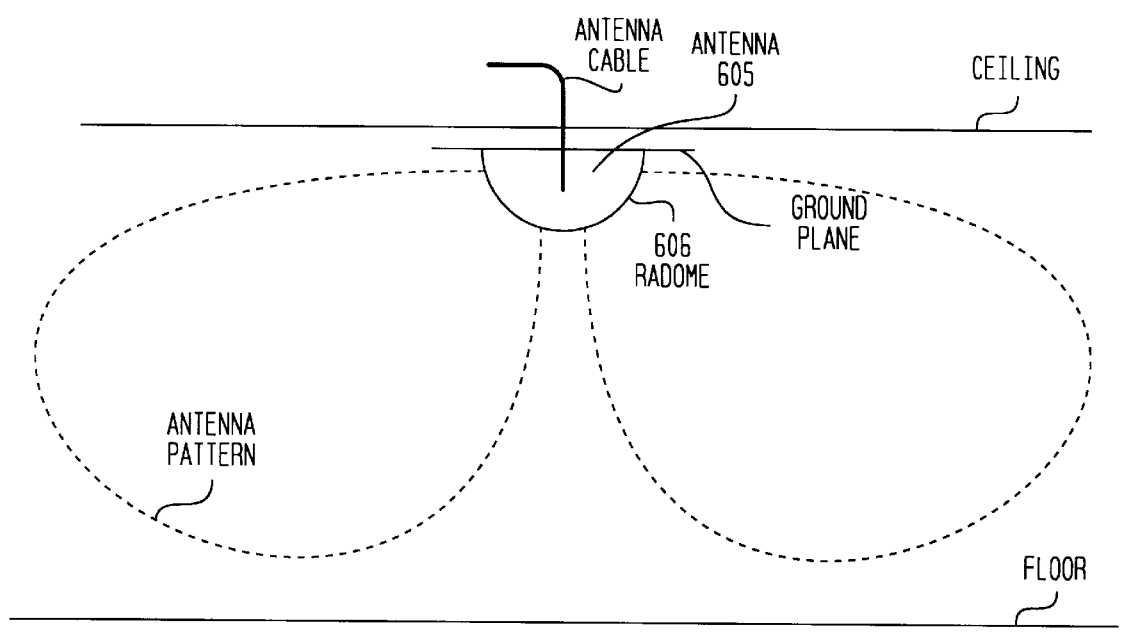
FIG. 6 shows a mounting arrangement for an omnidirectional antenna in the ceiling of a building.

FIG. 6 shows such a configuration. The Antenna (605) is encased in a Radome (606), or plastic covering, to protect the antenna from damage and to improve aesthetics.

Figure 7:
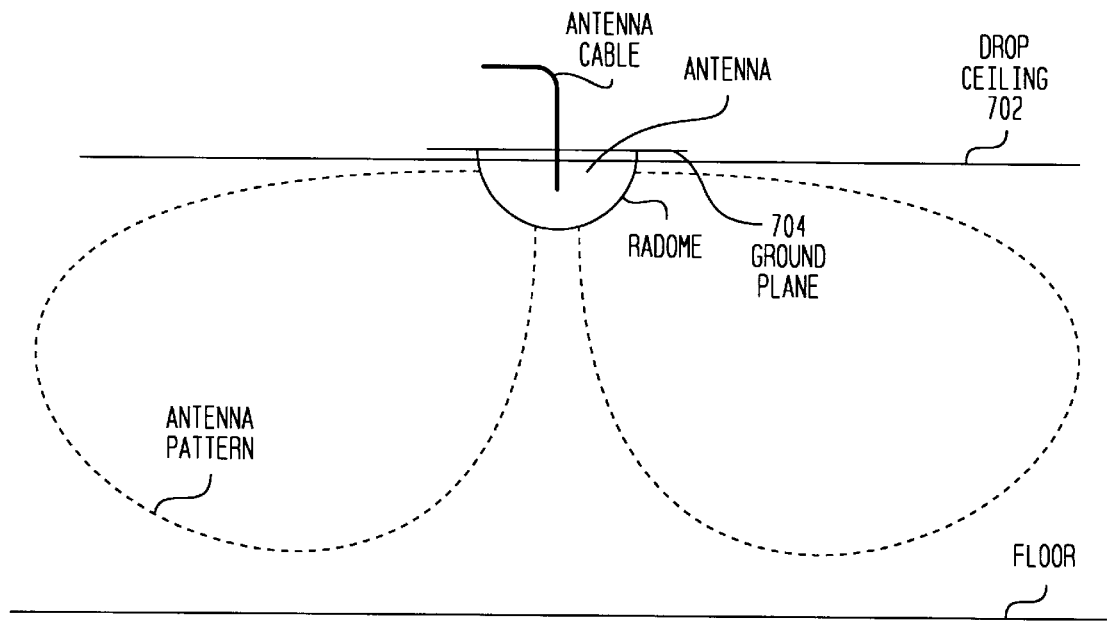
FIG. 7 shows an alternate arrangement for an omnidirectional antenna in the ceiling of a building.

An alternative configuration is shown in FIG. 7, where the building has a Drop Ceiling (702). Since most Drop Ceilings do not absorb much RF radiation, it is possible to locate the Ground Plane (704) above the Drop Ceiling with the Radome protruding down through the Drop Ceiling. Then, the only portion of the antenna that is visible is the Radome, which may be as few as 2–3 inches across, or even less. Thus, this design allows the antennas to be very inconspicuous. The antenna configuration presented in FIGS. 7 and 8 will be referred to as the "omnidirectional" antenna configuration.

Figure 8:
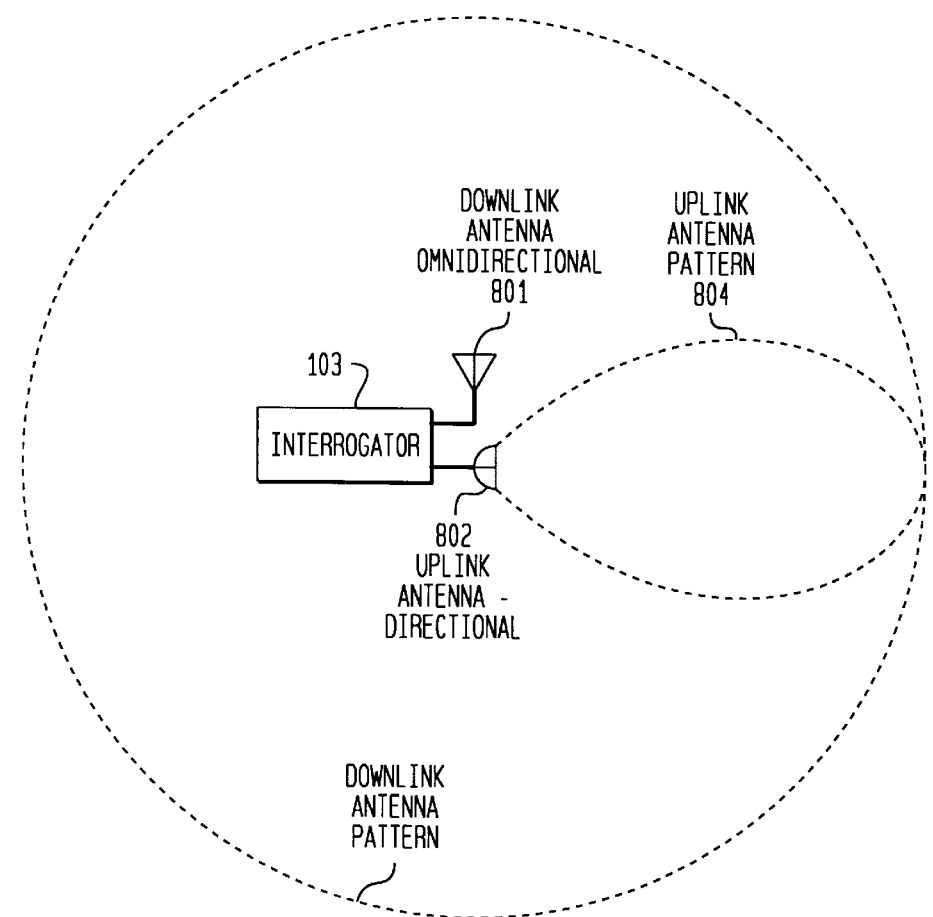
FIG. 8 shows the relationship between the Uplink Antenna pattern and the Downlink Antenna pattern.

Thus, in general, for the Location and Messaging Modes, the "omnidirectional" antenna pattern is useful for both the Downlink and the Uplink messages. For the Interrogation Mode, it is common for a directional antenna to be used to define a specific volume of space within which the Interrogation Mode is available. FIG. 8 shows one concept of how differing antenna patterns could be used to support the Interrogation Mode. The Downlink (or transmit) Antenna (801) could be omnidirectional; while the Uplink (or receive) Antenna (802) could be directional. Therefore, the Downlink Antenna (801) from this Interrogator could transmit Downlink Signals for any of the three Modes of operation; while the Uplink Antenna (802) (in the directional configuration) could receive the Uplink signal from the Tag operating in the Interrogation Mode.

Figure 9:
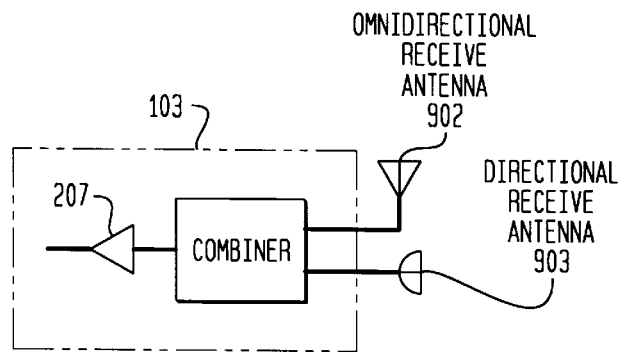
FIG. 9 shows an arrangement for combining the inputs from two receive antennas.
Figure 10:
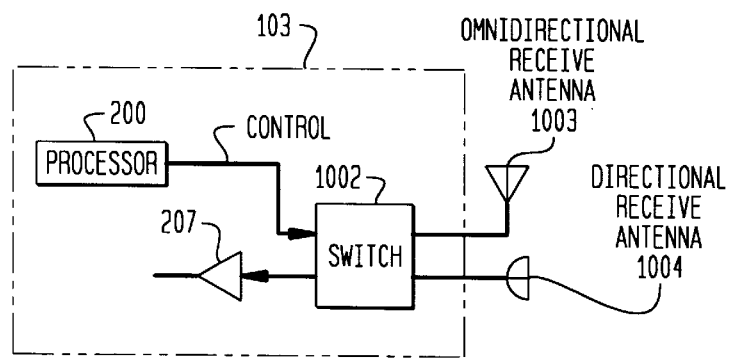
FIG. 10 shows an arrangement for switching between the inputs from two receive antennas.

FIGS. 9 and 10 illustrate two ways that different receive antennas can be used. FIG. 9 shows that the outputs of the Omnidirectional Receive Antenna (902) and the Directional Receive Antenna (903) are combined in a linear manner. This technique has the advantage of the system being simple and inexpensive, and capable of receiving Uplink signals from either antenna. However, it has the advantage of at least 3 dB of loss if the signal is coming from only one of the antennas. FIG. 10 shows a simple switch mechanism to use a Switch (1002) to switch from the Omnidirectional Receive Antenna (1003) to the Directional Receive Antenna (1004).

This has advantage of eliminating the 3 dB loss (assuming the switch has negligible loss), and the disadvantage of a more complex and costly Interrogator design.

Mode Transitions

Above, we discussed how communications with a Tag could begin in one Mode, and transition into another Mode, based upon the amount of data required to be transmitted and the received signal strength of the Uplink Signal. For example, referring to FIG. 2, the Signal Strength (214) signal, which in this embodiment is an output of the Subcarrier Demodulator (212), can be used by the Processor (200) to determine if adequate signal to noise exists to support the higher Uplink data rate required by the Interrogation Mode. It should be apparent that the Signal Strength (214) indicator could also be an output of the Filter Amplifier (210) or could even be taken from the Output (209) of the Mixer (208).

Another transition could be from the Location Mode to the Interrogation Mode. A Location Mode Interrogation Signal could be transmitted by the Interrogator, and the Signal Strength (214) indicator could be used to determine whether adequate signal-to-noise ratio exists to support the higher Uplink data rate required by the Interrogation Mode. In another transition, assume that a Tag is identified using the Interrogation Mode, and data communications begin with that Tag. During those data communications, the Uplink error rate (as determined by the Processor (200) which calculates an error detection code for each Uplink message) indicates that the signal to noise ratio is not great enough to support the Interrogation Mode Uplink data rate. Then, data communications can continue, but at a greatly reduced Uplink data rate, using the Messaging Mode.

RFID Protocol Architecture

Figure 11:
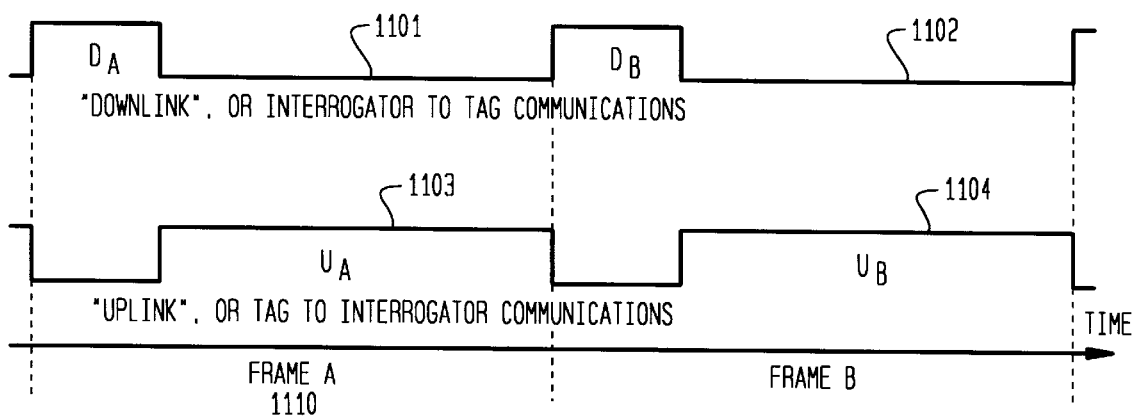
FIG. 11 shows the Frame structure of Downlink and Uplink signals.

We now outline a protocol for communication between the Interrogators (103) and the Tags (105) that supports the above modes of operation. In a typical RFID communications system, the Interrogators are the "masters" and the Tags are the "slaves". The Tags can only communicate to the Interrogators when the Interrogators request such communications. Therefore, let us divide time into logical "frames", where one frame includes first communications from the Interrogator to the Tag, and then includes communications from the Tags to the Interrogators. FIG. 11 shows a general outline of the frame structure; two Frames, Frame A and Frame B, are shown. Within Frame A (1110), the Interrogator communicates with the Tag during Downlink $D_A$ (1101); at the completion of Downlink $D_A$, the Tag communicates with the Interrogator during Uplink $U_A$ (1103). Similarly Frame B consists of Downlink $D_B$ (1102) and then Uplink $U_B$ (1104).

Figure 12:
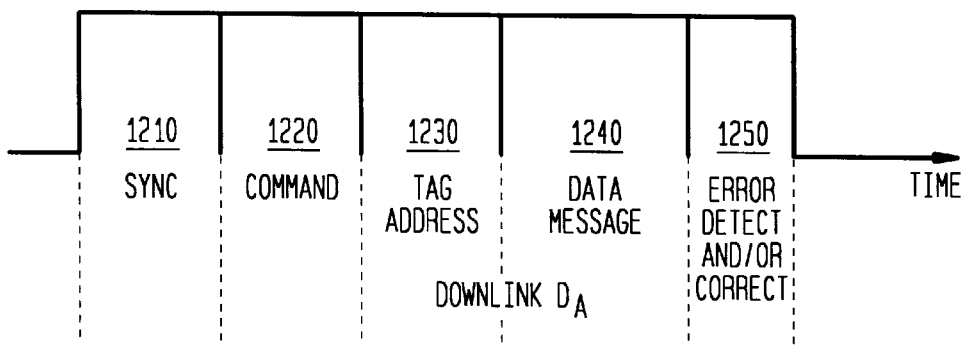
FIG. 12 shows one embodiment of how the Downlink signal could be subdivided.

FIG. 12 illustrates how Downlink $D_A$ (1101) could be structure First, a series of Sync (1210) bits could be sent; this would enable the Tag to synchronize to the timing of the Interrogator. Next, a Command (1220) bit field could be sent; this command would instruct the Tag as to which Mode of operation is being requested. Then, a Data Message (1240) would be sent; this Data Message would contain data for each and every Tag, such as clock data, frame synchronization information, etc. The last field would be the Error Detect (1250) field; this would provide error detection for the Downlink message, and depending on the number of bits transmitted, could also provide some measure of error correction. These are the fields required, in this illustrative example, for the Interrogation Mode. In another embodiment of the Interrogation Mode, the Sync (1210) and Command (1220) fields could be combined, and an explicit Error Detect (1250) field may not be required.

For the Location Mode, a specific Tag is being addressed; thus an additional field, namely a Tag Address (1230) field, is required. This field is used by the Tags to determine which specific Tag is being addressed. For the Messaging Mode, all of the fields shown in FIG. 12 could be present.

Figure 13:
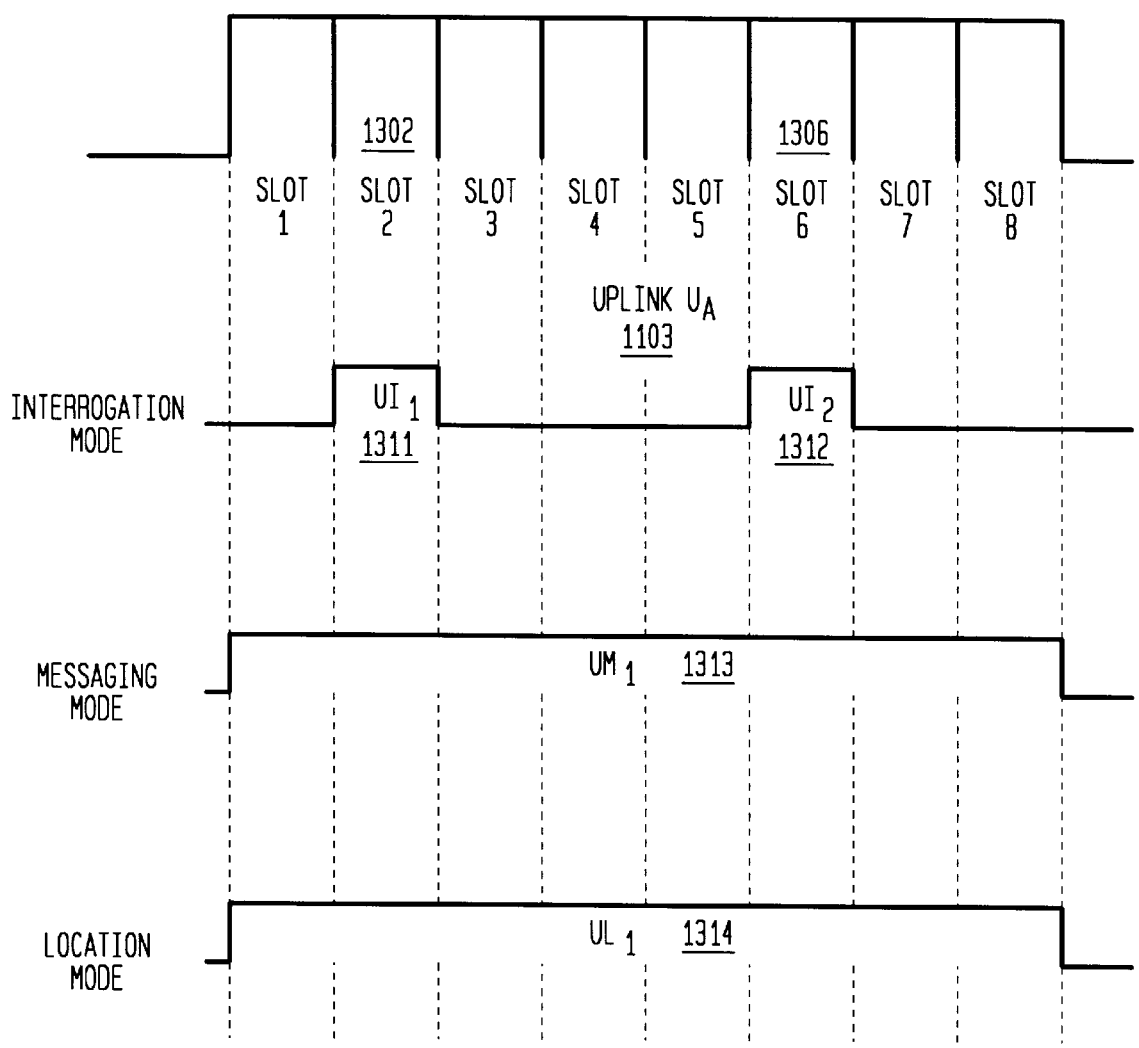
FIG. 13 shows one embodiment of how the Uplink signal could be subdivided.

FIG. 13 illustrates how the Uplink $U_A$ (1103) could be structured. The Uplink $U_A$ could be divided, for example, into eight "Slots". The three Modes of operation (Interrogation, Messaging, and Location) share the eight slots. This sharing can be done in several ways. The simplest method of sharing is pure time division multiplexing. In this method, the Interrogator first transmits Downlink $D_A$ (1101). This message instructs the Tags (105), for example, to respond in the "standard" Interrogation Mode. In this mode, the Tags transmit their uplink information multiple times in randomly chosen time slots. The number of time slots in which the uplink information is transmitted, and the number of time slots over which the entire transaction lasts, are both determined by probability arguments, based upon the number of Tags that must be supported in the reading field, the time required by the transaction, etc. To illustrate this method, FIG. 13 shows a Tag transmitting uplink information UI1 (1311) during Slot 2 (1302) and UI2 (1312) during Slot 6 (1306). This method allows multiple Tags to respond with their uplink information during the same Frame or set of Frames.

For the Messaging Mode, the Interrogator transmits Downlink $D_A$ (1101), whose Command (1220) field instructs the Tags that the Messaging Mode is desired, and also instructs all Tags to continue listening to Downlink $D_A$ (1101) SO that each can determine whether its address matches that contained in the Tag Address (1230) field to be transmitted next. The Tag whose address is present in the Tag Address (1230) field then responds by transmitting an uplink message. In FIG. 13, message UM1 (1313) is shown being transmitted in all eight Slots. The reason that all eight slots might be needed is to improve the signal-to-noise ratio of this Uplink signal such that the Uplink range in the Messaging Mode is comparable to the Downlink range.

For the Location Mode, the Interrogator transmits Downlink $D_A$ (1101), whose Command (1220) field instructs the Tags that the Location Mode is desired, and also instructs all Tags to continue listening to Downlink $D_A$ (1101) so that each can determine whether its address matches that contained in the Tag Address (1230) field to be transmitted next. The Tag whose address is present in the Tag Address (1230) field then responds by transmitting an uplink message. In FIG. 13, message UL1 (1314) is shown being transmitted in all eight slots. This Uplink message uses all eight slots for the same reason as discussed above for the Messaging Mode. Using this technique, Interrogation Mode messages such as UI1 and UI2 can share Uplink $U_A$ (1103) by transmitting in different Slots.

After the "standard" Interrogation Mode shown above, the Interrogator may wish to receive data from a specific Tag at the Interrogation Mode Uplink data rate. This could be done in several ways. In one embodiment, the Interrogator could transmit an Interrogation Signal to all Tags, as done in the "standard" Interrogation Mode, which contains a specific Tag Address (1230). This Interrogation Signal instructs this specific Tag to respond with specific data, the identity of the requested data specified in the Data Message (1240) field, and to use the Uplink slot mechanism shown in FIG. 13; i.e., to transmit the required data in only a subset of the available Slots. Other Tags in range of the Interrogation Mode signal could respond with their Mandatory Data in other of the available Slots, or the Interrogation Signal could instruct those other Tags to remain silent. In an alternate embodiment, the Interrogation Signal instructs a specific Tag to transmit the requested data in all of the Slots shown in FIG. 13, and also instructs all other Tags in range of the Interrogation Signal to be silent until another Interrogation Signal, with different instructions, is received.

The next issue to discuss is how a system can support all three Modes of operation using the same Interrogators. There are several embodiments of a solution to this issue; the two embodiments disclosed here involve the use of a) time division multiple access, and b) frequency division multiple access.

In a Time Division Multiple Access (TDMA) approach, the Uplink Signals are time shared. As shown in FIG. 1, each Interrogator communicates with the Application Processor via a wired or wireless LAN. The LAN provides both timing information and data transfer to and from the Interrogators. Let us classify a set of Interrogators that are within radio contact of each other as being in the same Domain. We define being in radio contact as the maximum ranges shown in FIG. 5 for one Interrogator not overlapping with the ranges of any other Interrogator; this Interrogator is in a separate Domain from the other Interrogators. Examples of Domains could be one floor of a building, or a subset of one floor of a building which is isolated from other subsets in an RF sense. Within each Domain, we desire all Interrogators to operate in a time-synchronized manner.

There are alternative embodiments for the Uplink. In one embodiment, for example, all Interrogators within each Domain are operating in the same Mode for each Uplink Signal (e.g., 1103). This embodiment is called Time Division Multiple Access (TDMA), because we are time-sharing the Uplink Signal (1103) time period among three Modes of operation.

In another embodiment, the Interrogation Mode can proceed simultaneously with the other two Modes; thus, the Location and Messaging Modes use TDMA to share the Uplink Signal (1103) time period. The Interrogation Mode and the other two Modes can share the Uplink Signal (1103) time period through the use of Frequency Division Multiple Access (FDMA). To accomplish FDMA, we note that the Frequency Source for the Subcarrier (308) is typically a crystal which is also used to provide the clock reference for the Processor. In the "Narrowband Operation" section above, the Frequency Source (308) was a 32 kHz crystal, chosen for its low cost, and the Subcarrier frequency was derived from the 32 kHz signal. We note that the Modulator Control (307), with a simple extension of the circuitry, could support the generation of more than one Subcarrier frequency. The Tag could be instructed, based upon the information in the Command (1220) of the Downlink Signal, as to which of (potentially several) Subcarrier frequencies to use to transmit their Uplink Signals. In this manner, more than one Tag could be transmitting an Uplink signal at the same time, since the Interrogator could decode (see below) Uplink signals on multiple Subcarrier frequencies at the same time. Using FDMA as outlined above, one Tag could be responding to an Interrogation Mode signal, and at the same time another Tag could be responding to a Location Mode signal on another Subcarrier frequency. The placement of the Subcarrier frequencies to allow an inexpensive Tag and Interrogator design is discussed below. We should note that the use of 32 kHz as a crystal frequency is just one example of potential crystal frequencies.

Tag Design

The basic operation of an RFID Tag using MBS technology is discussed above. Here we disclose specific techniques to support the three Modes of operation discussed above. When the Tag wishes to respond to a Location Mode signal, the Modulator Control (307) generates a subcarrier frequency $f_s$. In one embodiment, described below, the subcarrier frequency signal is not modulated with data, and that signal is used to apply alternating states of bias current to the Detector/Modulator (302) diode, thus changing the impedance match between the Antenna and the diode at the Subcarrier frequency $f_s$.

Let us assume that, during the Uplink Signal, the Interrogator is transmitting a pure CW tone of frequency $f_c$. When the Detector/Modulator diode (302) is alternately reverse and forward biased at the frequency $f_s$, then the reflected signal is at frequencies $(f_c-f_s)$ and $(f_c+f_s)$ (overtones of this mixing process are ignored). When this signal is received by the Interrogator, the results of the Subcarrier Demodulator (212) are a single tone at frequency $f_s$. The presence or absence of this Subcarrier frequency is then used to determine whether an acknowledgment is received.

In another embodiment, the Modulator Control (307) generates a subcarrier frequency $f_s$, and then modulates data, at a very low bit rate, onto that subcarrier. The resultant modulated subcarrier signal is used to apply alternating states of bias current to the Detector/Modulator (302) diode, thus changing the impedance match between the Antenna and the diode such that a reflected signal, at the Subcarrier frequency $f_s$, modulated with data, is generated. This latter embodiment could be used for the Tag to transmit information pertaining to its status in addition to simply transmitting a constant tone. In both cases, the signal strength of the received signal could be used to determine the location of the Tag.

When the Tag wishes to respond to the Interrogation or Messaging Mode, then an Information Signal (211) is modulated onto the Subcarrier frequency $f_s$. This modulation could be done using a number of techniques; however, for purposes of this discussion, we assume that either BPSK or QPSK modulation is used. When this signal is received by the Interrogator, the results of the Subcarrier Demodulator (212) are a BPSK or QPSK signal modulated onto a carrier of frequency $f_s$. The BPSK or QPSK signal is then demodulated from the Subcarrier $f_s$ to recover the Information Signal (211). In the Interrogation Mode, the Information Signal (211) has a bit rate of 50 kbps–300 kbps; while for the Messaging Mode, a much lower bit rate (discussed below) is used. The circuitry in the Modulator Control (307) to implement the capability of modulating different Information Signal data rates onto the Subcarrier frequency $f_s$ can be simple in design.

Interrogator Design

We now discuss how to implement an Interrogator (103) capable of supporting the three Modes of operation. The reflected signal is received by the Receive Antenna (206), and amplified by the Low Noise Amplifier (207). The Mixer (208) then performs the homodyne detection. The Mixer (208) should produce both I (in phase) and Q (quadrature) components of the demodulated signal. As discussed above, these signals can be re-combined at several different points in the system. For the purpose of this invention, the exact place and technique for this re-combination is not critical. Therefore, we assume the Filter Amplifier (210) re-combines these signals before the filtering process, using any one of a number of conventional combination techniques.

To implement an Interrogator (103) capable of supporting the three Modes of operation, care must be taken with filtering of the received signal, selection of the Subcarrier frequency, and demodulation techniques. First, let us consider the selection of the subcarrier frequency in general. The subcarrier must be selected with multiple criteria in mind. As discussed above, MBS systems must contend with "reflection noise", i.e., RF signals transmitted by the Interrogator that are reflected from objects in the RF field. Some objects, such as fluorescent lights, both modulate and reflect RF signals at overtones of the AC line frequency. Therefore, the subcarrier should be chosen to avoid as much of the reflection noise as possible.

Experiments have determined that reflection noise is reduced if the Subcarrier frequency is greater than 100 kHz. Thus, let us assume that the Subcarrier frequency $f_s$ is 100 kHz or greater.

The second factor to consider is the ease of generating the Subcarrier frequency in the Tag. Crystals are available at multiples of one megahertz, and also at "odd" frequencies, such as 3.5795 MHz, which are widely available as they are used in color television sets. Let us assume that a crystal of 8 MHz is chosen; then, circuitry to count down the 8 MHz to a Subcarrier frequency $f_s$ of 1 or 2 MHz is straightforward.

The Subcarrier frequency should not be chosen too large, for two reasons. First, crystals generally are more expensive at larger frequencies. Second, the demodulation of the information signal from the Subcarrier will be made more complex the higher the Subcarrier frequency; e.g., if the Subcarrier signal is sampled, the required sampling rate is proportional to the Subcarrier frequency. Thus, a high Subcarrier frequency will require more costly analog to digital converters, and (for example) a more powerful digital signal processor to process those sample. We believe a Subcarrier frequency greater than 100 kHz and less than 2 MHz is a good compromise.

Using a TDMA uplink, the same Subcarrier frequency $f_s$ is then used for all three Modes of operation. Then, the Filter Amplifier (210) in FIG. 2 can be centered on the same frequency for all three Modes. The bandwidth of the Filter Amplifier (210) would be designed to be wide enough to pass the greatest bandwidth signal, which is the Uplink Signal from the Interrogation Mode. For example, assume an Uplink Signal of 100 kbps using QPSK Modulation; then the signal bandwidth is 100 kHz. The filtered Uplink Signal is then sent to the Subcarrier Demodulator (212). For the Interrogation Mode, the (for example) QPSK information signal, at 100 kbps, is demodulated from the Subcarrier frequency using conventional techniques. For the Location and the Messaging Modes, additional processing in the Subcarrier Demodulator (212) is required. As mentioned above, the bandwidth of the information signal in the Interrogation Mode is (for example) 100 kHz. Let us estimate the bandwidth of the Uplink Signal for the Messaging Mode. Assume that each "Frame" is of a time duration such that the Uplink portion of the frame, such as $U_A$ (1203), is about 100 ms in duration. Further, assume that in the Messaging Mode, a total of 4 bits of information are transmitted. Thus, the effective bit rate is 40 bps; using (for example) QPSK modulation, the signal bandwidth is 40 Hz. Thus, the output of the Filter Amplifier (210) is 2,500 times greater than that required for the Messaging Mode; or, in other words, the noise bandwidth of the incoming signal for the Messaging Mode (100 kHz) is 34 dB greater than the 40 Hz necessary here, causing the effective range of the Messaging Mode to be greatly reduced. To recover this lost range, the narrowband techniques discussed above can be used. For the Location Mode, the Uplink Signal is a constant tone. Thus, in this example, the effective "data rate" is 10 bps, and the occupied signal bandwidth (in the absence of Doppler shifts) is 10 Hz. Thus, the noise bandwidth of the signal coming from the Filter Amplifier (210) (100 kHz) is 40 dB greater than the 10 Hz required here, leading to a large decrease in range. Again, narrowband filtering techniques must be used to decrease the noise bandwidth and recover the required range for the Location Mode. Thus, because the Subcarrier Demodulator (212) must both demodulate a 100 kbps signal, and also filter and demodulate a much lower bandwidth signal, a DSP is advantageously used as the Subcarrier Demodulator (212); this would be convenient because we require the received signal strength for both the Location and the Messaging Modes. If a DSP is used, then analog-to-digital converters are also required; however these are not explicitly shown in FIG. 2.

These operations could be implemented as follows. The Filter Amplifier (210) would initially filter the received signal at a bandwidth of, e.g., 100 kHz, sufficient for the Interrogation Mode Signal (1407, see FIG. 14). The Subcarrier Demodulator could be implemented as a DSP, or as a combination of a special purpose Application Specific Integrated Circuit (ASIC) and a DSP. The special purpose ASIC could be used to demodulate the Interrogation Mode Signal (1407), since no additional filtering would be required. For the Messaging Mode or Location Mode Signal (1406), a DSP would likely be required, since additional narrowband filtering is required to reduce the noise bandwidth to either 40 Hz or 10 Hz. A DSP could be programmed in a straightforward manner to implement one or the other of these two filter bandwidths. In the event that data must be demodulated from this subcarrier signal, the DSP could implement that demodulation in a straightforward manner using known techniques. Alternately, the DSP could perform all of the above functions, but only one at a time. The demodulation of the Interrogation Mode Signal would be straightforward for the DSP, and no additional filtering would be required. The DSP could also perform additional digital filtering and (if necessary) demodulation as discussed above for the Messaging and Location Modes.

Figure 14:
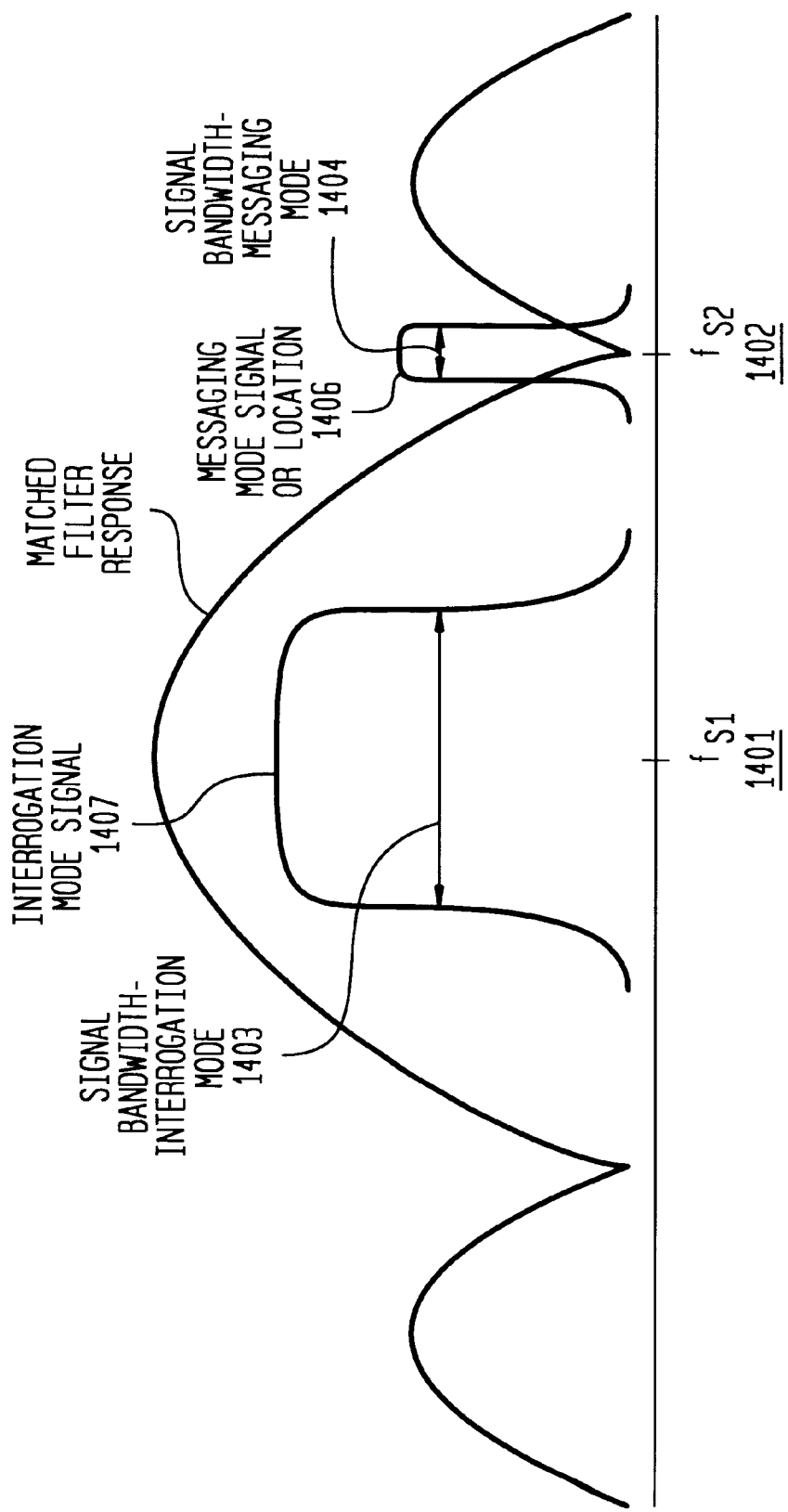
FIG. 14 shows where the Messaging Mode Uplink Response could be located.

Using an FDMA uplink, one Subcarrier frequency $f_{s1}$ is used for the Interrogation Mode, and another Subcarrier frequency $f_{s2}$ is used for the Messaging and Location Modes, as shown in FIG. 14. The Filter Amplifier (210) in FIG. 2 could be designed to pass both of the signals shown in FIG. 14. The Subcarrier Demodulator (212) then must be capable of processing both Uplink signals simultaneously. Let us assume, as above, that the Signal Bandwidth—Interrogation Mode (1403) is 100 kHz, and is located at Subcarrier frequency $f_{s1}$ (1401). Let us also assume, as above, that the Signal Bandwidth—Messaging Mode (1404) is 40 Hz, centered at Subcarrier frequency $f_{s2}$ (1402).

Figure 15:
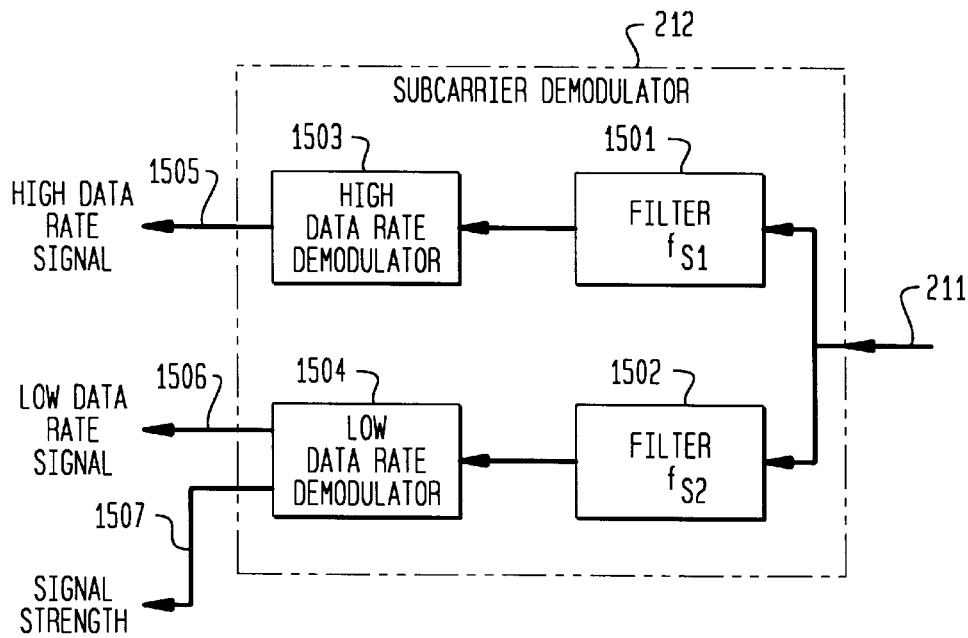
FIG. 15 shows how the Subcarrier Demodulator of FIG. 2 can support demodulation on two subcarrier channels.

FIG. 15 shows a possible embodiment of the Subcarrier Demodulator to implement FDMA. A Filter $f_{s1}$ (1501) is designed such that its response is centered around Subcarrier frequency $f_{s1}$, and this filter is used in conjunction with a High Data Rate Demodulator (1503) to recover the High Data Rate Signal (1505), which is the Uplink Signal from the Interrogation Mode (1407). A Filter $f_{s2}$ (1502) is designed such that its response is centered around a Subcarrier frequency $f_{s2}$, and this filter is used in conjunction with a Low Data Rate Demodulation (1504) to recover the Low Data Rate Signal (1506), which is the Uplink Signal from the Messaging or Location Mode (1406). Since the bandwidth of the Messaging and the Location Modes are relatively similar, we assume that the same device, a Low Data Rate Demodulator (1504), can be used to demodulate each signal.

Based on the above, the placement of Subcarrier frequency $f_{s2}$ could be as follows. Assume that Filter $f_{s1}$ is a matched filter (sin x/x). Assume the Subcarrier frequency $f_{s2}$ is located at the first zero of this filter (see Matched Filter Response (1505)). With this location of $f_{s2}$, the presence of the Messaging or Location uplink signal is heavily filtered by Filter $f_{s1}$ (1501), and thus that signal is unlikely to interfere with the High Data Rate Demodulator (1503). The Interrogation Mode Uplink Signal, centered at Subcarrier frequency $f_{s2}$, is unlikely to interfere with the Messaging or Location uplink signal since the Filter $f_{s2}$ is very narrowband.

The Subcarrier Demodulator (212) could be implemented in a DSP, assuming the DSP was powerful enough to process all of the functions of FIG. 15 in real time. The use of a DSP would also be convenient as we require the received signal strength for both the Location and the Messaging Modes. If a DSP is used, then analog to digital converters are also required; however these are not explicitly shown in FIG. 2 or in FIG. 15.

In another embodiment, a DSP could be used to implement both the Filter $f_{s2}$ (1502) and the Low Data Rate Demodulator (1504); this embodiment was outlined above in the TDMA discussion. Regardless of implementation, the Low Data Rate Demodulator (1504) must also output the Signal Strength (1507) of the received signal, for the purpose of providing that information to a central control element so that a Tag's location can be determined.

Protocol Parameter Choices

We now consider how to choose the various parameters outlined in the above protocol. The most important driving factors in these choices are a) how many Tags must the Interrogation Mode support in the reading field at the same time, b) at what speed do the Tags move through the reading field, and c) what is the maximum range that the Interrogation Mode must operate? Factors a), b), and c) all play a part in determining the most critical factor, which is the time duration of one Frame. Let us assume we are using TDMA within each Domain. Thus, the three Modes of operation "compete" for air time. Assume that the Application Processor (101) sends the following instructions to all Interrogators in one Domain. First, continue to support the Interrogation Mode, such that any Tags moving into the Uplink Antenna Pattern (see 804, FIG. 8) are interrogated. Second, determine the Location of Tag 12345. Third, send a text message to Tag 23456. Since Tags can enter the Uplink Antenna Pattern (804) of the Interrogation Mode at any time, the Interrogator must regularly transmit an Interrogation Frame; i.e., a Downlink Signal requesting Tags in the Uplink Antenna Pattern (804) to respond in the Interrogation Mode. The frequency of the regular transmission of Interrogation Frames is based upon factors a), b), and c). Let us assume we have determined, to achieve the requirements of the Interrogation Mode, that every other Frame must be an Interrogation Frame. Then, after the first Interrogation Frame, a Location Mode Frame can be transmitted to Tag 12345. Then, a second Interrogation Mode Frame is transmitted. Then, a Messaging Mode Frame addressed to Tag 23456 can be transmitted. Then, another Interrogation Mode Frame is transmitted. Then, the Location or the Messaging Mode instruction can be repeated if the proper acknowledgment is not received. In this manner, the three Modes of operation are time-shared Applications Interfaces FIG. 16 shows how the RFID system of FIG. 1 can be interconnected to other in-building communications systems. For example, a Voice Mail System (1610) can communicate with the Applications Processor (101) over the LAN (102); in addition, an Electronic Mail System (1630) can also communicate with the Applications Processor (101) over the LAN (102). Alternate embodiments support the Voice Mail System (1610) and/or the Electronic Mail System (1630) being directly connected to the Applications Processor (101) rather than being connected by the LAN (102). Furthermore, although FIG. 16 makes the Applications Processor (101) appear to be a separate element, it could be implemented as part of one, or more than one, of the Interrogators (103).

Let us assume that a message, addressed to Person 1, is received by the Voice Mail System (1610). Let us further assume that the Voice Mail System determines that this is an important message, and therefore a message should be transmitted to the Tag being carried by Person 1. The Voice Mail System (1610) could determine the importance of this message in several ways. For example, it could prompt the individual calling Person 1 with the question as to whether this voice message is of sufficient importance that Person 1 should be immediately informed of the message's arrival. Another method to determine importance is for the Voice Mail System (1610) to "filter" incoming messages according to pre-set criteria. Let us say that Person 1 always wants to be informed of a message from Person 2. Person 1 then requests the Voice Mail System (1610) to automatically inform Person 1 whenever a phone call comes in from the phone number of Person 2 (this could be done by using incoming number identification). Now that the Voice Mail System (1610) has determined that this is an important message, a Signal (1620) is sent to the Applications Processor (101) of the RFID System of FIG. 1. The Applications Processor then instructs all Interrogators, or perhaps all Interrogators in a particular Domain, to transmit a Messaging Mode Signal, informing the Tag (105) attached to Person 1 that an important message has arrived, perhaps including the name of Person 1 and/or the phone number of Person 1, and requesting a response from the Tag. When such a response is received by the Interrogator (105), it is forwarded in turn to the Applications Processor (101) and then to the Voice Mail System (1610) to indicate successful receipt of the message. When the message is successfully received by the Tag, how the fact that such a message has been received by Person 1 is the subject of the Shober-Pager patent application cited above, and hereby incorporated by reference.

When an electronic mail message is received by the Electronic Mail System (1630), a very similar procedure could be followed. The Electronic Mail System can be programmed to support a list of incoming electronic mail addresses, in which if a message is received from any of those addresses, Person 1 is immediately notified. The Electronic Mail System (1630) could transmit a Signal (1640) to the Applications Processor (101) in an identical manner to that described above. As above, the response could be transmitted back to the Electronic Mail System (1630) over route 1640. Not only could the fact that an incoming electronic mail message was received be transmitted to the Tag, but also some or all of the text of the message (depending on the amount of the text and the amount of data storage on the Tag). The Tag (105) could also transmit a response message back to the Electronic Mail System (1630); the mechanism for how the Tag can interact with Person 1 is discussed in the Shober-Pager patent application cited above.

We have seen how the RFID system can determine the approximate location of a specific Tag (105) through the use of the Location Mode discussed above, and also through the Interrogation Mode. Let us assume that Interrogators (103) are located throughout the building, routinely transmitting Interrogation Mode messages. Tags (105) that are in range of the Interrogation Mode will respond with their Mandatory Data. Therefore, at this point in time, we have an approximate location for this Tag based upon a) which Interrogator received the Mandatory Data, and b) the time of day. Therefore, referring to FIG. 16, let us assume that for every successful Interrogation Mode transaction, the Interrogator (103) transmits to the Applications Processor (101) a message containing at least the identification number of the Tag, the location of the Interrogator (103) which successfully communicated with the Tag, and the time of day. This information is stored in the Location Database (1650).

Let us assume that the Voice Mail System (1610), or the Electronic Mail System (1630), or Another System (1660) desires to locate Person 1. The first thing for the Applications Processor to do is to check the Location Database (1650) to determine if a recent location is on file for Person 1. If the location is recent enough, the information in the Location Database (1650) may be adequate. The information in the database may be helpful in narrowing down where in the building Person 1 is currently located; thus, for example, the Applications Processor (101) could instruct only those Interrogators (103) in the Domain where the Tag (105) was last detected to transmit Location Mode signals.

It is noted that the location system outlined above can be useful to locate Tags attached to humans, as well as Tags attached to animals or to items in inventory. Thus, in addition to in-building security applications, the above techniques apply equally well to general inventory management applications.

Emergency Mode

The above examples illustrate how messages, inquiries, etc. can be communicated from outside the RFID system of FIG. 1, to the Tag (105), and back outside the system. Let us consider the case in which the Tag (105) determines that data must be transmitted to the nearest Interrogator. (The above-cited Shober-Pager application discusses a mechanism for human interaction with a Tag.) One example of such a condition would be if the Tag (105) was informed of an emergency condition.

There are several ways, within the system disclosed above, that such an "unsolicited" request could be transmitted. The Tag (105) is always in Downlink range, and therefore always in Uplink range for the Messaging Mode. The Tag, when receiving a Messaging Mode transmission, could respond with an Uplink Signal of a specific bit pattern that would be identified by the Subcarrier Demodulator (212) of the Interrogator (103).

Figure 17:
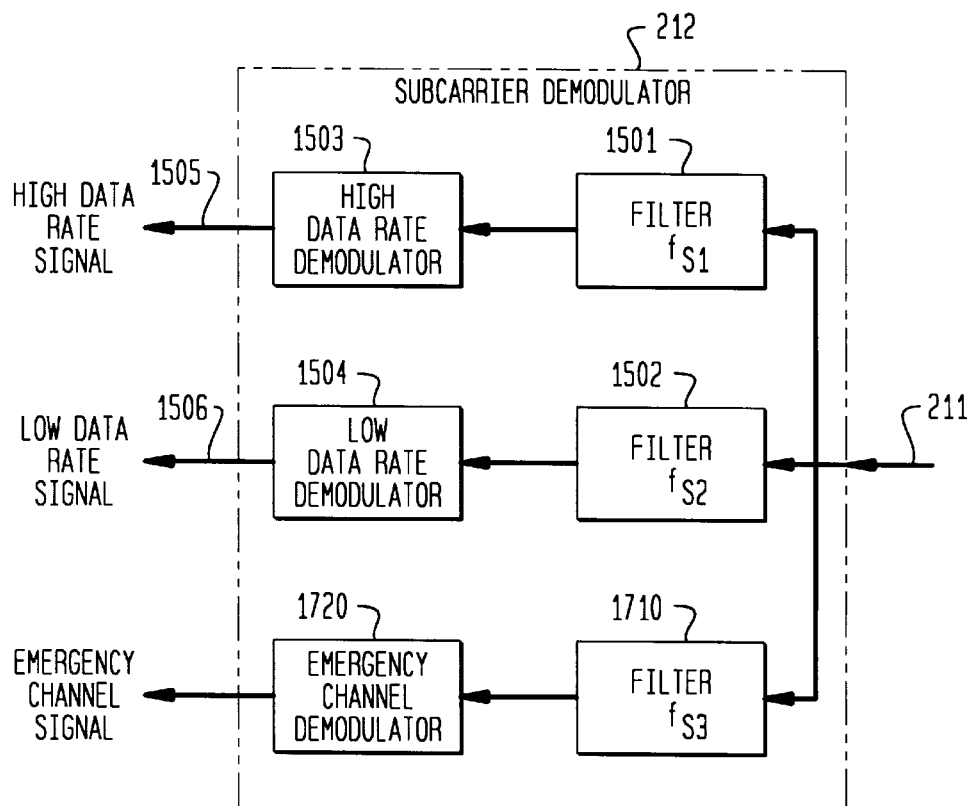
FIG. 17 shows how the Subcarrier Demodulator of FIG. 2 can also support demodulation on an Emergency Channel.

Alternately, the Tag could respond to the Messaging Mode transmission, but it could transmit the Messaging Mode Uplink on a different subcarrier frequency $f_s$ than normally used; this could be the "emergency channel." To receive this signal, referring to FIG. 15, an additional set of devices (Filter $f_2$ (1502) and Low Data Rate Demodulator (1504)) could be incorporated into the Subcarrier Demodulator (212). These additions are shown in FIG. 17. The Filter $f_s3$ (1710) and the Emergency Channel Demodulator (1720) are always tuned to the subcarrier frequency of the "emergency channel." Therefore, the Tag (105) could always be able to inform the Applications Processor (101) of unusual operations, etc.

What has been described is merely illustrative of the application of the principles of the present invention. Other arrangements and methods can be implemented by those skilled in the art without departing from the spirit and scope of the present invention.

The invention claimed is:

1. A communication system comprising at least one control element adapted to transmit data to at least one interrogator, at least one interrogator adapted to transmit a modulated radio signal to at least one tag, and at least one mag adapted to form a reflected modulated signal for reception by at least one said interrogator, wherein:

interrogator comprises a generator of a First Information Signal, the First Information Signal having contents taken, at least in part, from data received from the control element;

the interrogator further comprises a modulator, responsive to the First Information Signal generator, adapted to modulate a radio signal with the First Information Signal, thereby to generate the modulated radio signal;

the tag comprises a generator of a subcarrier signal, and a modulator adapted to modulate the subcarrier signal using a Second Information Signal, thereby to generate a modulated subcarrier signal;

the tag further comprises a backscatter modulator adapted to modulate a reflection of the modulated radio signal using the modulated subcarrier signal, thereby to form the reflected modulated signal;

the interrogator further comprises a demodulator adapted to demodulate the reflected modulated signal, thereby to recover the Second Information Signal;

the interrogator further comprises means for determining one or more characteristics of the Second Information Signal;

the interrogator further comprises means for transmitting, to the control element, data that comprise at least some contents of, or one or more characteristics of, the Second Information Signal; and the control element comprises means for determining the location of a specific said tag.

2. The system of claim 1, wherein the means for determining characteristics of the Second Information Signal comprise means for determining a signal strength of said Second Information Signal.

3. The system of claim 1, wherein the control element comprises means for transmitting, to at least one said interrogator, a request to determine the location of a specific said tag.

4. The system of claim 1, wherein the control element comprises means for communicating the current location of at least one said tag to at least one other communication system.

5. The system of claim 1, further comprising a storage medium for storing the location of at least one said tag in a database.

6. The system of claim 1, further comprising a storage medium for storing a history of locations of at least one said tag in a database.

7. The system of claim 1, wherein, in the interrogator, said demodulator comprises a homodyne demodulator.

8. The radio communication system of claim 1, wherein the means for determining characteristics of the Second Information signal comprise a digital signal processor (DSP).

9. The system of claim 1, wherein the means for determining characteristics of the Second Information signal comprise means for performing a Fourier Transform.

10. The system of claim 1, wherein the interrogator further comprises an antenna mounted in a drop ceiling covered by a radome.

11. The system of claim 1, wherein:
interrogator further comprises an antenna mounted in a drop ceiling covered by a radome, the antenna having a ground plane; and
the antenna is mounted in the drop ceiling such that the ground plane lies above the drop ceiling.

12. The system of claim 1, wherein:
the interrogator further comprises at least one antenna; and
the antenna comprises a ground plane mounted parallel to the surface of the earth, and a monopole protruding downward from the ground plane.

13. The system of claim 1, wherein the interrogator further comprises a transmit antenna and a receive antenna, said antennas having antenna gains that differ by more than 3 dBi.

14. The system of claim 1, wherein:
the interrogator further comprises a transmit antenna and a receive antenna, said antennas having antenna gains that differ by more than 3 dBi; and
said transmit antenna includes a ground plane mounted parallel to the surface of the earth, and further includes a monopole protruding downward from said ground plane.

15. The system of claim 1, wherein the interrogator further comprises at least two receive antennas.

16. The system of claim 1, wherein the interrogator further comprises at least two receive antennas, and means for combining signals from said at least two receive antennas.

17. The system of claim 1, wherein the interrogator further comprises at least two receive antennas, and means for switching between signals from said at least two receive antennas.

18. The system of claim 1, further comprising means for transmitting the First Information Signal to each said tag.

19. A communication system comprising:
at least one interrogator adapted to modulate a radio signal with a First Information Signal, resulting in a modulated radio signal, and further adapted to transmit the modulated radio signal to at least one tag; and
at least one tag adapted to receive the modulated radio signal and to form therefrom a reflected modulated signal for reception by at least one said interrogator, wherein:
the tag comprises a generator of a subcarrier signal, and a modulator adapted to modulate the subcarrier signal using a Second Information Signal, thereby to generate a modulated subcarrier signal;
the tag further comprises means, responsive to the First Information Signal, for determining at least some content, data rate or modulation of the Second Information Signal based on contents of the First Information Signal;
the tag further comprises a backscatter modulator adapted to modulate a reflection of the modulated radio signal using the modulated subcarrier signal, thereby to form the reflected modulated signal;
the interrogator further comprises a demodulator adapted to demodulate the reflected modulated signal, thereby to recover the Second Information Signal;
the interrogator further comprises means for determining one or more signal quality characteristics of the Second Information Signal;
the interrogator further comprising means, responsive to one or more said signal quality characteristics of the Second Information Signal, for making a determination whether the tag should alter the content, data rate, or modulation of the Second Information Signal; and
the interrogator further comprises means for conforming the First Information Signal to this determination.

20. The system of claim 19, wherein said means responsive to one or more signal quality characteristics of the Second Information Signal are adapted to respond to a signal strength of said Second Information Signal.

21. A communication system comprising at least one tag, said tag comprising:
means for receiving a radio signal;
means for determining whether to transmit an unsolicited message;
means for generating a subcarrier signal;
means for providing an information signal that indicates or describes said unsolicited message;
means for modulating the subcarrier signal with the information signal, thereby to form a modulated subcarrier signal; and
backscatter-modulator means for modulating a reflection of the radio signal using the modulated subcarrier signal, thereby to form a reflected modulated signal.

22. The system of claim 21, further comprising at least one interrogator, the interrogator comprising:
means for receiving and demodulating the reflected modulated signal, thereby to recover the information signal; and
means for detecting, in the information signal, an indication of said unsolicited message.

23. The system of claim 22, further comprising at least one control element, the control element comprising:
means for receiving at least some contents of the information signal, said contents indicating said unsolicited message, from at least one said interrogator.

24. A communication system comprising at least one tag, the tag comprising:
means for receiving a radio signal;
means for generating at least two subcarrier signals;
means for detecting at least one condition in response to which a message is to be transmitted;
means for selecting, for generation, a particular one of said at least two subcarrier signals when at least one said condition is detected, said particular subcarrier signal to be referred to as Subcarrier A;
means for modulating Subcarrier A with an information signal that comprises an indication or description of said condition, thereby to form a modulated subcarrier signal; and
backscatter modulator means for modulating a reflection of the radio signal using the modulated subcarrier signal, thereby to form a reflected modulated signal.

25. The system of claim 24, further comprising at least one interrogator, the interrogator comprising:
means for receiving the reflected modulated signal;
means for demodulating the reflected modulated signal; and
means for determining whether a signal is present on Subcarrier A.

26. The system of claim 25, further comprising at least one control element in receiving relationship to at least one said interrogator with respect to at least some contents of the reflected modulated signal, the control element comprising means for deriving from said contents an indication that at least one said condition is present.

27. An interrogator, comprising:
means for transmitting a radio signal to at least one tag;
means for receiving a reflected modulated signal from at least one said tag; and
means for demodulating the reflected modulated signal to obtain a modulated subcarrier signal, said demodulation means configured to demodulate said reflected modulated signal at one of at least two subcarrier frequencies, to be denoted Subcarrier Frequency A and Subcarrier Frequency B, wherein said Subcarrier Frequency A and said Subcarrier Frequency B correspond to different operating modes.

28. The interrogator of claim 27, wherein Subcarrier Frequency B is located at a first zero of a matched filter response for the modulated subcarrier signal located at Subcarrier Frequency A.

29. The interrogator of claim 27, wherein the demodulation means are adapted for performing the demodulation at Subcarrier Frequency A simultaneously with the demodulation at Subcarrier Frequency B.

30. The interrogator of claim 27, wherein the demodulation means are adapted to perform the demodulation at least at three subcarrier frequencies, to be denoted Subcarrier Frequency A, Subcarrier Frequency B, and Subcarrier Frequency C.

31. The interrogator of claim 30, wherein the demodulation means are adapted for performing simultaneous demodulation at Subcarrier Frequencies A, B, and C.

32. A communication system comprising: a messaging system; at least one control element adapted to receive transmitted downlink data from the messaging system and to transmit at least some of the downlink data to at least one interrogator; at least one interrogator adapted to transmit at least some of the downlink data to at least one tag using modulated radio signals; and at least one tag, wherein:
the tag comprises means for transmitting uplink data to the interrogator using modulated backscatter radio communications;
the interrogator comprises means for transmitting at least some of the uplink data to the control element; and
the control element comprises means for transmitting at least some of the uplink data to the messaging system.

33. The system of claim 32, wherein the messaging system comprises means for selecting only a portion of the downlink data for transmission to the control element.

34. A communication system comprising: at least one control element; at least one tag; a location system comprising means for transmitting, to the control element, a location request to locate a specific said tag; and at least one interrogator, wherein:

the control element comprises means for transmitting the location request to the interrogator;
the interrogator comprises means for transmitting the location request to at least one said tag using modulated radio signals;
the tag comprises means for determining whether it is an addressee of a given location request received from the interrogator, such determination to be referred to as a positive determination if said tag is an addressee;
the tag further comprises means for transmitting an uplink signal to the interrogator, using modulated backscatter radio communications, only in case of a positive determination;
the interrogator further comprises means for taking measurements of one or more characteristics of the uplink signal, and for transmitting one or more said measurements to the control element; and
the control element further comprises means for receiving said one or more measurements, means for determining the location of the tag, and means for transmitting resulting location information to the location system.

35. The communication system of claim 34, wherein said characteristic-measuring means comprise means for measuring a signal strength of said uplink signal.

36. The communication system of claim 34, wherein the control element further comprises a database for storing said location information.

37. The communication system of claim 36, wherein said database is adapted for storing a history of said location information.

38. A communication system, comprising:
at least one control element; at least one tag; at least two interrogators, each adapted to receive downlink data from the control element and to transmit downlink data to at least one said tag; and a messaging system adapted to transmit downlink data to at least one said control element, wherein:
at least one said tag is adapted to transmit uplink data to at least one said interrogator using modulated backscatter radio communications; and at least one said interrogator is adapted to transmit at least some of the uplink data to the messaging system;
the control element comprises means for determining the location of at least one selected tag,
the control element further comprises means for transmitting at least some of the downlink data, using modulated radio signals, to at least one interrogator selected for transmission of downlink data to at least one said selected tag, and
the control element further comprises means for designating said selected interrogator based upon the location of at least one said selected tag.

* * * * *